United States Patent [19]

Elsenbaumer

[11] Patent Number: 5,160,457

[45] Date of Patent: * Nov. 3, 1992

[54] THERMALLY STABLE FORMS OF ELECTRICALLY CONDUCTIVE POLYANILINE

[75] Inventor: Ronald L. Elsenbaumer, Morristown, N.J.

[73] Assignee: Allied-Signal Inc., Morristown, N.J.

[*] Notice: The portion of the term of this patent subsequent to Dec. 3, 2008 has been disclaimed.

[21] Appl. No.: 317,367

[22] Filed: Mar. 1, 1989

Related U.S. Application Data

[63] Continuation-in-part of Ser. No. 82,886, Aug. 7, 1987, Pat. No. 5,069,820.

[51] Int. Cl.$^5$ .......................... H01B 1/00; H01B 1/06
[52] U.S. Cl. .................................. 252/500; 252/518; 252/519
[58] Field of Search ...................... 252/500, 518, 519; 528/422; 524/157, 158

[56] References Cited

U.S. PATENT DOCUMENTS

| | | | |
|---|---|---|---|
| 3,963,498 | 6/1976 | Trevoy | 252/500 |
| 4,025,463 | 5/1977 | Trevoy | 252/500 |
| 4,798,685 | 1/1989 | Yaniger | 252/500 |
| 4,806,271 | 2/1989 | Yaniger et al. | 252/500 |
| 4,822,638 | 4/1989 | Yaniger | 252/500 |
| 4,851,487 | 7/1989 | Yaniger et al. | 252/500 |
| 4,855,361 | 8/1989 | Yaniger et al. | 252/500 |

FOREIGN PATENT DOCUMENTS

| | | |
|---|---|---|
| 0035713 | 2/1981 | European Pat. Off. . |
| 0152632 | 12/1984 | European Pat. Off. . |
| 0259813 | 9/1987 | European Pat. Off. . |
| 62-12073 | 1/1987 | Japan . |
| 62-47109 | 2/1987 | Japan . |

OTHER PUBLICATIONS

T. Masatake et al; "Secondary batteries with polyaniline cathods"; Aug. 8, 1988; Chemical Abstracts, vol. 109, No. 6, & Jpn. Kokai Tokkyo Koho JP 63 55,861 (88 55,861) Mar. 10, 1988.

Chan et al., Thermal Analysis of Conducting Polymers Part I, Journal of Thermal Analysis, 35, 765-774 (1989).
Jen et al., Intl' Appl. #PCT/US88/02319.
S. Li et al. "Soluble Polyaniline" Synthetic Metals, 20 (1987) 141-149.
K. Hyodo et al. "Short Communication . . . High Ion Selective Electro chemical . . . " Electro Acia vol. 33, No. 1, pp. 165-166, 1983.
L. T. Yu et al. "Conductivite et Constitution Chimique pe Semi-Conducteurs Macromoleculaires" Revue Generale de L'Elec. vol. 75 No. 9/pp. 1014, 1019.
M. Jozefowicz et al. "Relations entre Proprietes Chimiques et . . . " Revue General de L'Electricite vol. 75, No. 9, pp. 1008-1013.
D. Muller et al. "Preparation, Proprietes Chimique et Conduct . . . " pp. 4087-4091.
L. T. Yu et al. "Etude experimentale de la Conductivite en Couran Continu des Composes Macromoleculaires" Jrnl Polymer Sc. Pt C, No. 16/p. 29312942.
M. Jozefowicz et al. "Proprietes Nouvelles des Polymeres Semi . . . " J. Poly. Sci. Part C/No. 22, pp. 1187-1195 (1969).
T. Kobayashi et al. "Electrochemical Reactions Concerned with Electrochromism . . . " J. Electroanal Chem. 177/(1984) pp. 281-291.
T. Kobayashi et al. "Oxidative Degradation Pathway of Polyaniline Film Electrodes" J. Electroanal Chem. 177 (1984) pp. 293-297.
F. Cristofini et al. "Properties Electrochimiques des Sulfates de Polyaniline" C.R. Acad. Sc. Paris, t. 268 (14 avril 1969) pp. 1346-1349.

(List continued on next page.)

Primary Examiner—Karl Group
Assistant Examiner—Anthony J. Green
Attorney, Agent, or Firm—R. C. Stewart, II; G. H. Fuchs; D. L. Webster

[57] ABSTRACT

This invention relates to compositions of thermally stable electrically conductive substituted and unsubstituted polyanilines and to conductive articles formed from such compositions.

69 Claims, 9 Drawing Sheets

OTHER PUBLICATIONS

D. Labarre et al. "Polymeres Conducteurs Organiques Filmogenes a base de Polyaniline" C.R. Acad. Sc. Paris, t. 269 (Oct. 29, 1969) pp. 964–969 Series C.

M. Doriomedoff et al. "Conductivite en Courant Continu Des Sulfates De Polyanilines" (#142) pp. 1055–1069.

L–T Yu et al. "Conductivite en Courant Continu des Materiaux Macromoleculaires" pp. 470–532 (Chapter 11).

R. de Surville et al. "Produits Oligomeres et Polymeres D'Oxydation des Amines Aromatiques" Ann. Chim. t2, 1967, pp. 5–13.

R. de Surville, "Electrochemical Chains Using Protolytic Organic Semiconductors" Elec. Acta 1958 vol. 13, pp. 1451–1458.

R de Surville, "Produits D'oxidation Pousée des Amines Aromatiques" Ann. Chim. t2, 1967, pp. 149–157.

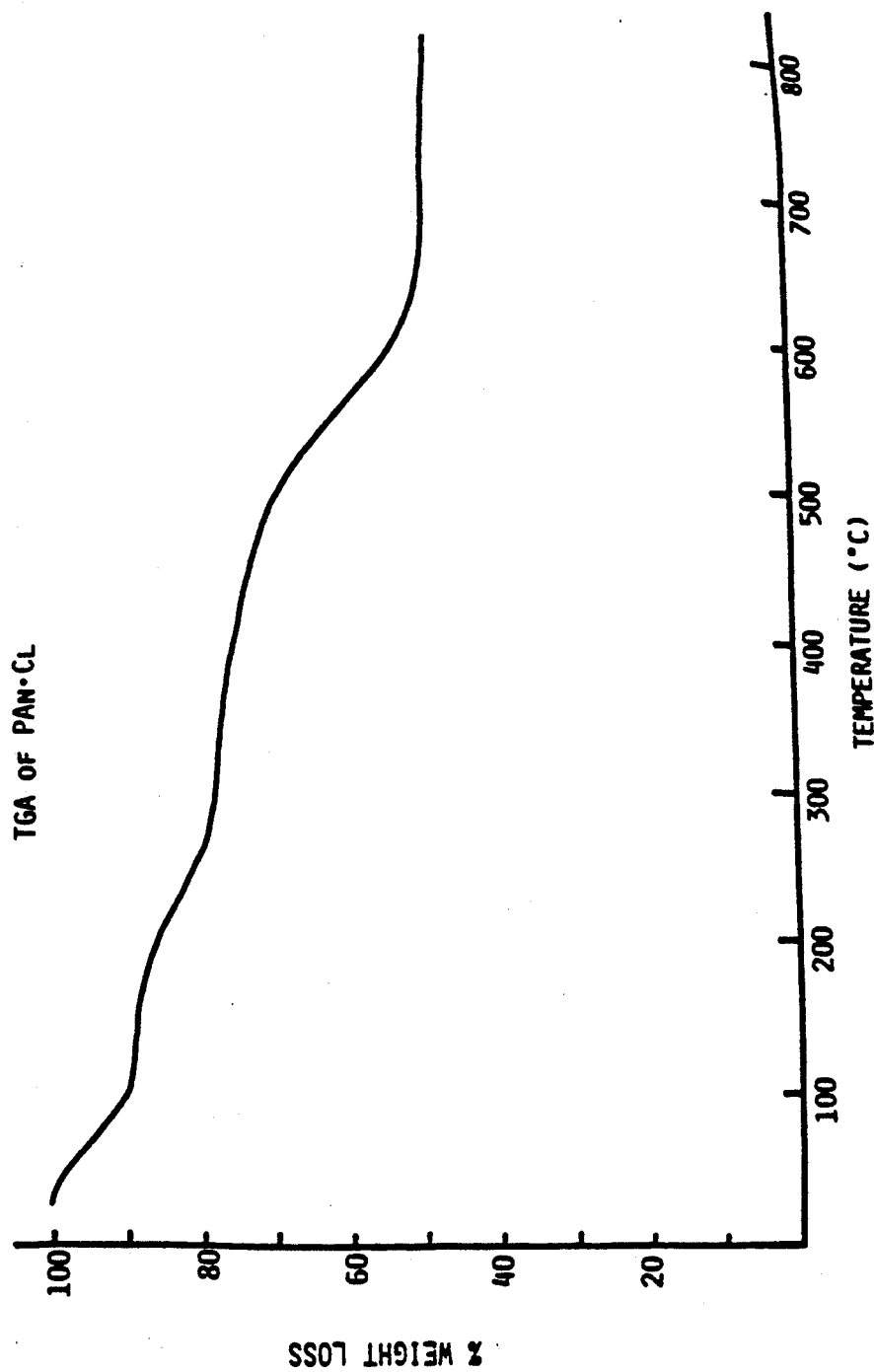

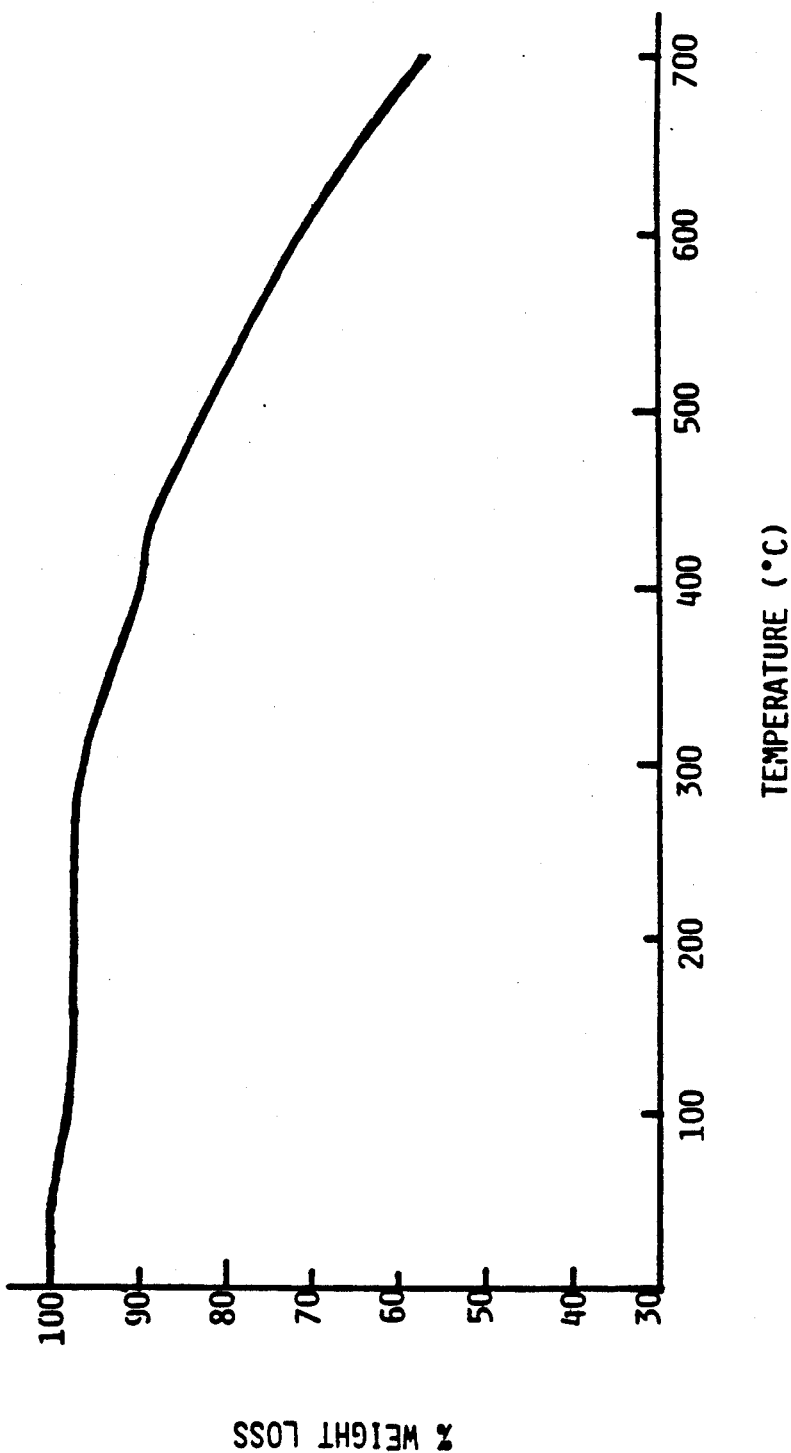

THERMALLY STABLE FORMS OF ELECTRICALLY CONDUCTIVE POLYANILINE

RELATED APPLICATIONS

This application is a continuation-in-part application of U.S. patent application Ser. No. 082,886, filed Aug. 7, 1987, now U.S. Pat. No. 5,069,820.

BACKGROUND OF THE INVENTION

1. Field of the Invention

This invention relates to thermally stable electrically conductive substituted or unsubstituted polyanilines, and to compositions comprising such polyanilines and other non-electrically conductive polymers. Another aspect of this invention relates to a method of using such polyanilines and compositions to give conducting polymer articles, including films, fibers and coatings, and to fabricate such articles.

2. Prior Art

There has recently been an increased interest in the electrochemistry and electrical phenomena of polymeric systems. Recently, work has intensified with backbone polymers having extended conjugation in at least one backbone chain.

One conjugated polymer system currently under study is polyaniline. Kobayashi, Tetsuhiko, et al., *J. Electroanal. Chem.*, "Electrochemical Reactions Concerned With Electrochromism of Polyaniline Film-Coated Electrodes", 177 (1984) 281-291, describes various experiments in which spectro electro-chemical measurement of a polyaniline film coated electrode were made. French Patent No. 1,519,729; French Patent of Addition 94,536; U.K. Patent 1,216,549; "Direct Current Conductivity of Polyaniline Sulfate", M. Donomedoff, F. Kautier-Cristojini, R. ReSur-vall, M. Jozefowicz, L-T. Yu, and R. Buvet, J. Chim. Phys. Physicohim. Brol 68, 1055 (1971); "Continuous Current Conductivity of Macromolecular Materials", L-T. Yu, M. Jozefowicz, and R. Buvet, Chim. Macromol. 1, 469 (1970); "Polyaniline Based Filmogenic Organic Conductive Polymers", D. LaBarre and M. Jozefowicz, C. R. Read. Sci., Ser. C, 269, 964 (1969); "Recently Discovered Properties of Semiconducting Polymers", M. Jozefowicz, L-T, Yu, J. Perichon, and R. Buvet, J. Polym. Sci., Part C, 22, 1187 (1967); "Electrochemical Properties of Polyaniline Sulfates", F. Cristojini, R. De Surville, and M. Jozefowicz, Cr. Read. Sci., Ser. C, 268, 1346 (1979); "Electrochemical Cells Using Protolytic Organic Semiconductors", R. De Surville, M. Jozefowicz, L-T. Yu, J. Perichon, R. Buvet, Electrochem. Ditn. 13, 1451 (1968); "Oligomers and Polymers Produced by Oxidation of Aromatic Amines", R. De Surville, M. Jozefowicz, and R. Buvet, Ann. Chem. (Paris), 2 5 (1967); "Experimental Study of the Direct Current Conductivity of Macromolecular Compounds" L-T. Yu, M. Borredon, M. Jozefowicz, G. Belorgey, and R. Buvet, J. Polym. Sci. Polym. Symp., 16, 2931 (1967); "Conductivity and Chemical Properties of Oligomeric Polyaniline", M. Jozefowicz, L-T. Yu, G. Belorgey, and R. Buvet, J. Polym. Sci., Polym. Symp., 16, 2934 (1967); "Products of the Catalytic Oxidation of Aromatic Amines", R. De Surville, M. Jozefowicz, and R. Buvet, Amm. Chem. (Paris), 2, 149 (1967); "Conductivity and Chemical Composition of Macromolecular Semiconductors", Rev. Gen. Electr., 75 1014 (1966); "Relation Between the Chemical and Electrochemical Properties of Macromolecular Semiconductors", M. Jozefowicz and L-T. Yu, Rev. Gen. Electr., 75 1008 (1966); "Preparation, Chemical Properties, and Electrical Conductivity of Poly-N-Alkyl Anilines in the Solid State", D. Muller and M. Jozefowicz, Bull. Soc. Chem. Fr. 4087 (1972).

U.S. Pat. Nos. 3,963,498 and 4,025,463 describe oligomeric polyanilines and substituted polyanilines having not more than 8 aniline repeat units which are described as being soluble in certain organic solvents and which are described as being useful in the formation of semiconductors compositions having bulk electrical conductivities up to about $7 \times 10^{-3}$ S/cm and, surface resistivities of $4 \times 10^7$ ohm/square. European Patent No. 0017717 is an apparent improvement in the compositions of U.S. Pat. Nos. 3,963,498 and 4,025,463 and states that the polyaniline can be formed into a latex composite through use of acetone solutions of the oligomers of polyaniline and a suitable binder polymer.

In the general field of conducting polymers, it was heretofore neither demonstrated nor conceived that thermally stable conductive polyanilines could be prepared, and that compositions comprising such polyanilines and one or more thermoplastic polymers could be fabricated into useful articles by melt blending techniques. Thus, a need exists for thermally stable electrically conductive polyanilines and for techniques to facilitate the fabrication of shaped conductive polyaniline articles, especially articles such as films, sheets, fibers, prismatic objects and coatings.

SUMMARY OF THE INVENTION

One aspect of the present invention relates to a thermally stable, electrically conductive doped polyaniline comprised of an ionized polyaniline backbone polymer and one or more dopant solute species selected from the group consisting of:

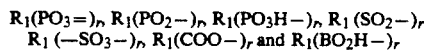

wherein $R_1$ is the same or different at each occurrence and is a substituted or unsubstituted organic radical, and r is a positive whole number equal to or greater then 1. Another aspect of this invention is articles formed from this polyaniline. This invention also relates to a composition comprising a matrix of one or more thermoplastic polymers having one or more doped polyanilines of this invention dispersed therein, and to articles formed from this composition. This invention also relates to a process for forming the compositions of this invention by melt-blending one or more doped polyaniline of this invention and one or more thermoplastic polymers.

As used herein, "polyanilines" are homopolymers or copolymers in which at least 50 mole % of the recurring monomeric units are derived from unsubstituted or substituted anilines of the formula:

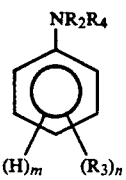

wherein:
n is an integer from 0 to 4;

m is an integer from 1 to 5 with the proviso that the sum of n and m is equal to 5;

R$_2$ and R$_4$ are the same or different and are R$_3$ substituents, hydrogen or alkyl with the proviso that at least one of R$_2$ or R$_4$ is hydrogen; and R$_3$ is the same or different at each occurrence and is selected from the group consisting of deuterium, alkyl, alkenyl, alkoxy, cycloalkyl, cycloalkenyl, alkanoyl, alkythio, aryloxy, alkylthioalkyl, alkylaryl, arylalkyl, amino, alkylamino, dialkylamino, aryl, alkylsulfinyl, aryloxyalkyl, alkylsulfinylalkyl, alkoxyalkyl, alkylsulfonyl, phosphonic acid, borate, carboxylate, phosphonate, sulfonate, phosphinate, arylthio, sulfinate, sulfinic acid, alkylsulfonylalkyl, arylsulfinyl, alkoxycarbonyl, arylsulfonyl, carboxylic acid, halogen, hydroxy, cyano, sulfonic acid, nitro, or alkylsilane; or alkyl substituted with one or more sulfonic acid, phosphoric acid, phosphonic acid, sulfinate, sulfinic acid, borate, carboxylate, phosphonate, sulfonate, phosphinate, boric acid, carboxylic acid, halo, nitro, cyano or epoxy moieties; or any two R$_3$ groups together or an R$_3$ group together with any R$_4$ or R$_2$ group may form an alkylene or alkenylene chain completing a 3, 4, 5, 6 or 7 membered aromatic or alicyclic ring, which ring may optionally include one or more divalent nitrogen, sulfur, sulfinyl, ester, carbonyl, sulfonyl, or oxygen atoms; or R$_3$ is an aliphatic moiety having repeat units of the formula:

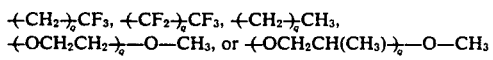

wherein q is a positive whole number; with the proviso that said homopolymer or copolymer includes about 10 or more recurring aniline moieties in the polymer backbone.

As used herein, an "organic radical" is polymeric or other type of radical.

BRIEF DESCRIPTION OF DRAWINGS

In the drawings,

FIG. 8 is a graph showing percent weight loss as a function of temperature for polyaniline doped with chloride anions.

FIG. 9 is a graph showing percent weight loss as a function of temperature for polyaniline doped with tosylate anions.

DETAILED DESCRIPTION OF THE INVENTION

Figure 1:
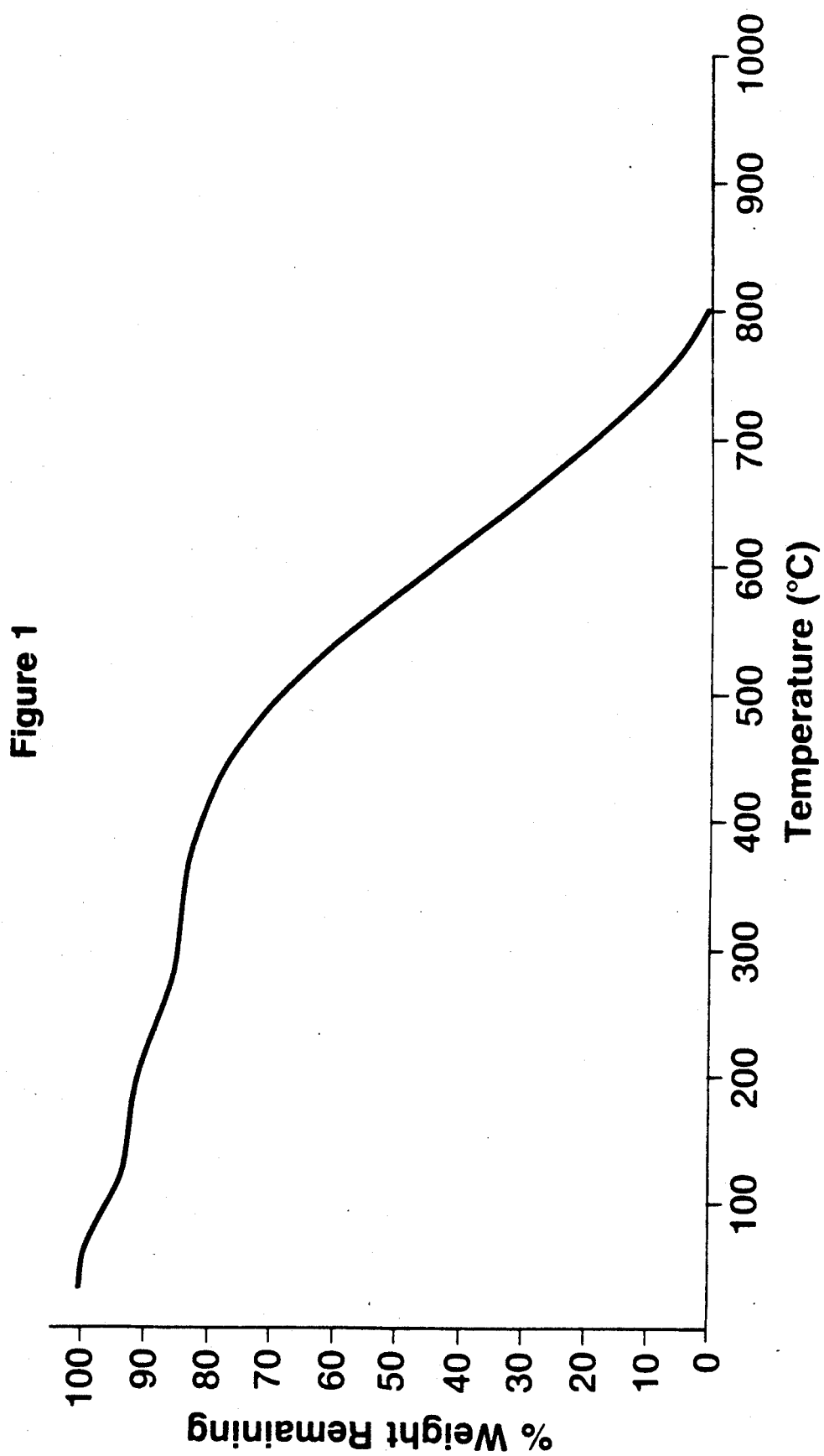
FIG. 1 is a thermogravimetric analysis (TGA) spectrum under argon or poly(aniline chloride) as prepared in Example 1.

The thermally stable electrically conductive polyaniline of this invention comprises two essential ingredients. One essential ingredient is a substituted or unsubstituted polyaniline. In general, polyanilines for use in the invention are homopolymers and copolymers derived from the polymerization of unsubstituted and substituted anilines of the Formula I:

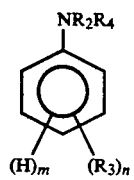

wherein:

n is an integer from 0 to 4;

m is an integer from 1 to 5 with the proviso that the sum of n and m is equal to 5;

R$_2$ and R$_4$ are the same or different and are R$_3$ substituents, hydrogen or alkyl; and R$_3$ is the same or different at each occurrence and is selected from the group consisting of alkyl, deuterium, alkenyl, alkoxy, cycloalkyl, cycloalkenyl, alkanoyl, alkythio, aryloxy, alkylthioalkyl, alkylaryl, arylalkyl, amino, alkylamino, dialkylamino, aryl, alkylsulfinyl, aryloxyalkyl, alkylsulfinylalkyl, alkoxyalkyl, phosphonic acid, alkylsulfonyl, arylthio, alkylsulfonylalkyl, boric acid, phosphoric acid, sulfinate, arylsulfinyl, alkoxycarbonyl, arylsulfonyl, carboxylic acid, phosphonic acid, halogen, hydroxy, cyano, sulfinic acid, carboxylate, borate, phosphate, sulfonate, phosphinate, phosphonate, phosphonic acid, sulfonic acid, nitro, alkylsilane or alkyl substituted with one or more phosphonic acid, sulfonic acid, phosphoric acid, boric acid, carboxylate, borate, sulfonate, phosphinate, phosphonate, phosphate acid, phosphinic acid, carboxylic acid, halo, nitro, cyano or epoxy moieties; or any two R$_3$ groups together or any R$_3$ group together with any R$_1$ or R$_2$ group may form an alkylene or alkenylene chain completing a 3, 4, 5, 6 or 7 membered aromatic or alicyclic ring, which ring may optionally include one or more divalent nitrogen, sulfur, sulfinyl, ester, carbonyl, sulfonyl, or oxygen atoms; or R$_3$ is a divalent organic moiety bonded to the same or a different substituted or unsubstituted aniline moiety or R$_3$ is an aliphatic moiety having repeat units of the formula:

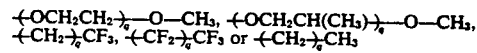

wherein q is a positive whole number; with the proviso that said homopolymer and copolymer includes about 10 or more recurring substituted or unsubstituted aniline aromatic moieties in the polymer backbone.

Illustrative of the polyanilines useful in the practice of this invention are those of the Formulas II to V:

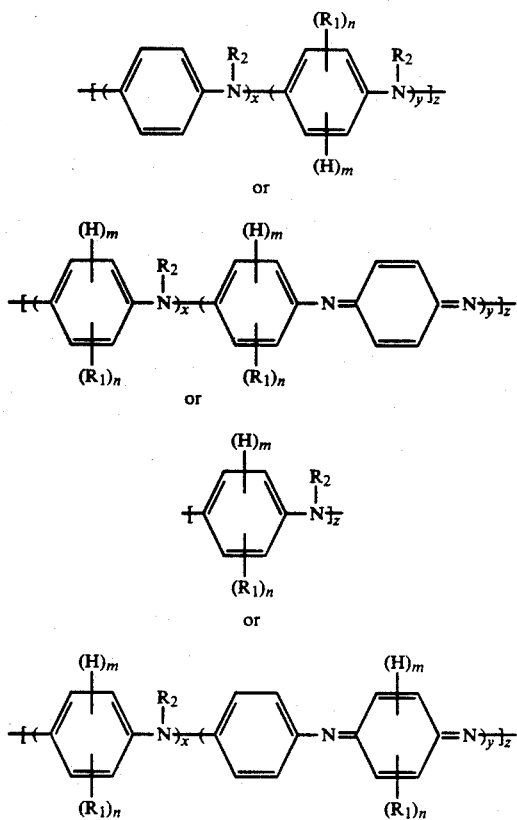

wherein:

z is an integer equal to or greater than 1.

x is an integer equal to or greater than about 1, with the proviso that the ratio of x to y is greater than or equal to about 0.5; and z, v and u are the same or different and are integers equal or greater than 1.

The following listing of substituted and unsubstituted anilines are illustrative of those which can be used to prepare polymers and copolymers useful in the practice of this invention.

| | |
|---|---|
| 2-Cyclohexylaniline | 2-Acetylaniline |
| Aniline | 2,5-Dimethylaniline |
| o-Toluidine | 2,3-Dimethylaniline |
| 4-Propanoylaniline | N,N-Dimethylaniline |
| 2-(Methylamino)aniline | 4-Benzylaniline |
| 2-(Dimethylamino)aniline | 4-Aminoaniline |
| 2-Methyl-4-methoxy-carbonylaniline | 2-Methylthiomethylaniline |
| | 4-(2,4-Dimethylphenyl) aniline |
| 4-Carboxyaniline | 2-Ethylthioaniline |
| N-Methyl aniline | N-Methyl 2,4-Dimethylaniline |
| N-Propyl aniline | N-Propyl m-Toluidine |
| N-Hexyl aniline | N-Methyl o-Cyanoaniline |
| m-Toluidine | 2,5-Dibutylaniline |
| o-Ethylaniline | 2,5-Dimethoxyaniline |
| m-Ethylaniline | Tetrahydronaphthylamine |
| o-Ethoxyaniline | o-Cyanoaniline |
| m-Butylaniline | 2-Thiomethylaniline |
| m-Hexylaniline | 2,5-Dichloroaniline |
| m-Octylaniline | 3-(n-Butanesulfonic acid) aniline |
| 4-Bromoaniline | |
| 2-Bromoaniline | 3-Propoxymethylaniline |
| 3-Bromoaniline | 2,4-Dimethoxyaniline |
| 3-Acetamidoaniline | 4-Mercaptoaniline |
| 4-Acetamidoaniline | 4-Ethylthioaniline |
| 5-Chloro-2-methoxy-aniline | 3-phenoxyaniline |
| 5-Chloro-2-ethoxy-aniline | 4-phenoxyaniline |
| N-Hexyl-m-Toluidine | |

| | |
|---|---|
| 4-phenylthioaniline | N-Octyl m-Toluidene |
| 3-amino-9-methylcarbazole | 4-trimethylsilyaniline |
| 4-amino carbazole | 3-amino carbazole |
| | N-(p-amino phenyl) aniline |

Exemplary of useful $R_2$ and $R_4$ groups are hydrogen, methyl, ethyl, isopropyl, butyl, isobutyl, hexyl, octyl and the like.

Illustrative of useful $R_3$ groups are hydrogen, alkyl, such as methyl, ethyl, octyl, nonyl, tert-butyl, neopentyl, isopropyl, sec-butyl, dodecyl and the like, alkenyl such as 1-propenyl, 1-butenyl, 1-pentenyl, 1-hexenyl, 1-heptenyl, 1-octenyl and the like; alkoxy such as propoxy, butoxy, methoxy, isopropoxy, pentoxy, nonoxy, ethyoxy, octoxy, and the like; cycloalkenyl such as cyclohexenyl, cyclopentenyl and the like; alkanoyl such as butanoyl, pentanoyl, octanoyl, ethanoyl, propanoyl and the like; alkylsulfinyl, alkylsulfonyl, alkylthio, arylsulfinyl, arylsulfonyl, and the like, such as butylthio, neopentylthio, methylsulfinyl, benzylsulfinyl, phenylsulfinyl, propylthio, octylthio, nonylsulfonyl, octylsulfonyl, methylthio, isopropylthio, phenylsulfonyl, methylsulfonyl, nonylthio, phenylthio, ethylthio, benzylthio, phenethylthio, sec-butylthio, naphthylthio and the like; alkoxycarbonyl such as methoxycarbonyl, ethoxycarbonyl, butoxycarbonyl and the like; cycloalkyl such as cyclohexyl, cyclopentyl, cyclooctyl, cycloheptyl and the like; alkoxyalkyl such as methoxymethylene, ethoxymethyl, butoxymethyl, propoxyethyl, pentoxybutyl and the like; aryloxyalkyl and aryloxyaryl such as phenoxyphenyl, phenoxymethylene and the like; and various substituted alkyl and aryl groups such as 1-hydroxybutyl, 1-aminobutyl, 1-hydroxylpropyl, 1-hydroxypentyl, 1-hydroxyoctyl, 1-hydroxyethyl, 2-nitro-ethyl, trifluoromethyl, 3,4-epoxybutyl, cyanomethyl, 3-chloropropyl, 4-nitrophenyl, 3-cyanophenyl, and the like; alkyl or aryl groups terminated with phosphonic acid, phosphinic acid, sulfinate, sulfonic acid, sulfinic acid, phosphoric acid, boric acid, or carboxylic acid groups such as ethylsulfonic acid, propylsulfonic acid, butylsulfonic acid, phenylsulfonic acid, and the corresponding phosphoric acid, boric acid, sulfonic acid, carboxylic acid, sulfinate, sulfinic acid, phosphonic acid, and phosphinic acid.

Also illustrative of useful $R_3$ groups are divalent moieties derived from any two $R_3$ groups or a $R_3$ group with an $R_1$ or $R_2$ group such as moieties of the formula:

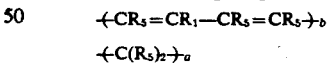

wherein a is an integer from about 3 to about 7, and b is an integer from 1 to 2 and $R_5$ is the same or different at each occurrence and is hydrogen or alkyl, as for example —(CH$_2$)—$_4$, —(CH$_2$)—$_3$ —(CH=CH—CH=CH)—[—(H$_2$—CHCCH$_3$)—CH$_2$—],[—(CCH$_3$)H]$_3$— and —(CH$_2$)—$_5$, or such moieties which optionally include heteroatoms of oxygen, nitrogen, ester, sulfonyl, carbonyl, sulfinyl, and/or sulfur such as —CH$_2$SCH$_2$— —CH$_2$NHCH$_2$, —SCH$_2$NHCH$_2$—, —O—CH$^2$- —S—CH$_2$—, —CH$_2$S(O$_2$)CH$_2$—, —CH$_2$S(O)CH$_2$—, —OC(O)CH$_2$CH$_2$, —CH$_2$C(O)CH$_2$ and —CH$_2$—O—CH$_2$— to form heterocyclic amino compounds such as tetrahydronaphthylamine, dihydrobenzopyrroleamine, benzofuranamine, dihydrobenzopyranamine, dihydrobenzofuranamine, dihydrobenzoparoxazineamine, dihydrobenzoparadiazineamine, dihydrobenzotetrazoleamine, dihydrobenzothiazineamine, benzothiopyranamine, dihydrobenzoxazoleamine and the like. Exemplary of useful $R_3$ groups are divalent alkenylene chains containing 1 to about 3 unsaturated bonds such as divalent 1,3-butadiene and like moieties which may also include one or more divalent oxygen, nitrogen, sulfinyl, sulfonyl, carbonyl, ester, and/or sulfur groups which form such compounds as benzodiazineamine, benzodiazoleamine, benzotriazepineamine, benzoimidazolylamine, benzoxazoleamine, benzoixazoleamine, benzoxazolylamine, benzotriazineamine, benzoxazineamine, naphthaleneamine, benzopyranamine, benzothiazineamine, anthraceneamine, aminobenzothiopyran, aminobenzodiazine, benzethiopyrone, aminocoumarin, benzothiophene, benzothiodiazoleamine, and the like.

Preferred for use in the practice of this invention are polyanilines of the above Formulas II to V in which:

n is an integer from 0 to about 2;

m is an integer from 3 to 5, with the proviso that the sum of n and m is equal to 5;

$R_2$ and $R_4$ are the same or different at each occurrence and are hydrogen, methyl or ethyl;

$R_3$ is alkyl or alkoxy having from 1 to about 30 carbon atoms, cyano, halogen, or alkyl substituted with phosphonic acid, phosphate, phosphoric acid, borate, sulfonate, carboxylate, phosphonate, boric acid, phosphinic acid, phosphinate, carboxylic acid or sulfonic acid substituents;

x is an integer equal to or greater than 1;

y is equal to or greater than 0, with the proviso that the ratio of x to y is greater than about 1;

z is an integer equal to or greater than about 5;

u is an integer equal to or greater than about 3; and v is an integer equal to or greater than about 10.

Particularly preferred for use in the practice of this invention are polyanilines of the above Formulas II to V in which:

n is an integer from 0 to 2;

m is an integer from 3 to 5, with the proviso that the sum of n and m is equal to 5;

$R_2$ and $R_4$ are the same or different at each occurrence and are hydrogen or methyl;

$R_3$ is alkyl or alkoxy having from 1 to about 20 carbon atoms, or alkyl substituted with carboxylic acid, phosphonic acid, phosphate, phosphoric acid, borate, sulfonate, carboxylate, phosphonate, or sulfonic acid substituents;

x is an integer equal to or greater than 2;

y is equal to or greater than 0, with the proviso that the ratio of x to y is greater than about 2;

z is an integer equal to or greater than about 10;

u is an integer equal to or greater than about 5; and v is an integer equal to or greater than about 20.

Amongst the particularly preferred embodiments, most preferred for use in the practice of this invention are polyanilines of the above Formulas III or V in which:

n is an integer from 0 to 1;

m is an integer from 4 to 5, with the proviso that the sum of n and m is equal to 5;

$R_2$ and $R_4$ are hydrogen;

$R_3$ is alkyl or alkoxy from 1 to about 15 carbon atoms;

x is an integer equal to or greater than 2;

y is equal to or greater than 1, with the proviso that the ratio of x to y is greater than about 2; and u is an integer equal to or greater than about 6. In the most preferred embodiments of this invention, the polyaniline is derived from unsubstituted or alkyl substituted aniline.

In general, the number of aniline repeat units is at least about 10. In the preferred embodiments of the invention, the number of aniline repeat units is at least about 20, and in the particularly preferred embodiments, the number of repeat units is at least about 30. Amongst the particularly preferred embodiments, most preferred are those embodiments in which the number of repeat units is at least about 40.

Any form of substituted and unsubstituted polyaniline can be conveniently used in the practice of this invention. Illustrative of useful forms are those described in Green, A. G. and Woodhead, A. E., "Aniline-black and Allied Compounds, Part I", J. Chem. Soc., vol. 101, pp. 1117 (1912) and Kobayashi, et al., "Electrochemical Reactions ... of Polyaniline Film-Coated Electrodes", J. Electroanal. Chem., Vol 177, pp. 281-91 (1984), which is hereby incorporated by reference. For example, unsubstituted polyaniline, useful forms include leucoemeraldine, protoemeraldine, emeraldine, nigraniline and tolu-protoemeraldine forms.

Useful polyanilines can be prepared through use of chemical and electrochemical synthetic procedures. For example, one form of polyaniline can be prepared by treating aniline with ammonium persulfate $(NH_4)_2S_2O_8$ in excess 1M HCl. This powdered form of polyaniline is blue green in color. After methanol washing and air drying this material exhibits a conductivity of 10 S/cm. This conductive form of polyaniline can be treated with ammonium hydroxide in ethanol to form a non-conductive form of polyaniline which is purple in color and which has a conductivity of less than $10^{-8}$ S/cm. Other chemical procedures for preparation of various chemical forms of polyaniline are described in detail in Green et al. described above.

Useful forms of polyaniline can also be prepared electrochemically. For example, useful forms of polyaniline can be prepared by the electrochemical oxidation of aniline in aqueous fluoroboric acid electrolyte on a platinum foil anode.

Other chemical and electrochemical syntheses and transformations of the conductive form of polyaniline may be discovered and are presently contemplated as being useful. Moreover, additional forms or types of polyaniline may be elucidated in the future. Accordingly, no limitation to the syntheses, transformation, or structures herein described or postulated is intended beyond the limitations of the appended claims.

The second essential ingredient of the thermally stable polyaniline of this invention is a dopant solute. The purpose of the dopant is to render polyaniline electrically conductive. In general, such dopant solute is derived from a compound, which upon addition to the polyaniline, ionizes the polymer with co-committent formation of a dopant solute species. Illustrative of useful dopant species are those formed from ionization of neutral ionic compounds, polymers or the like selected from the group consisting of:

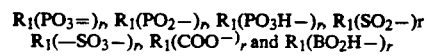

and having one or more cationic moieties selected from the group consisting of:

wherein:

$R_1$ is an organic radical, amino, alkylamino, dialkylamino, arylamino, diarylamino, or alkylarylamino;

M is a species having a positive charge equal to n; and n and r are the same and are 1 to 8.

The $R_1$ group may vary widely and can be a substituted or unsubstituted aliphatic radical such as alkyl, nitroalkyl, haloalkyl and the like, or a substituted or unsubstituted aromatic radical such as phenyl, halophenyl, nitrophenyl, anthracyl, naphthyl, phenanthryl and the like. $R_1$ may also be a polymeric radical such as a polymer having recurring pendant phenyl groups in the polymeric backbone substituted with sulfonic acid, phosphoric acid, phosphonate, phosphonic acid, sulfinate, sulfinic acid, phosphate, carboxylate, sulfonate, borate, phosphinate, carboxylic acid, boric acid, or phosphonic acid moieties such as sulfonated or phosphonated polystyrene, poly(2-methylstyrene), poly(4-phenylstyrene), poly($\alpha$-vinyl naphthalene), poly(vinyl benzoate), poly(benzyl methacrylate) and the like. In the particularly preferred embodiments of the invention, $R_1$ is an aromatic radical and in the most preferred embodiments $R_1$ is substituted or unsubstituted phenyl or naphthyl.

The nature of the $M^{+n}$ group may vary widely. For example, $M^{+n}$ may be a non-metal cation such as $Bu_4N^+$, $H^+$, $NO^+$, $NO_2^+$ $NH_4^+$ and the like, or may be a metal cation such as $Na^+$, $Li^+$, $Ag^+$, $Ba^{+2}$, $Co^{+3}$, $Al^{+3}$, $Fe^{+3}$, and the like.

The following is a listing of dopants which are useful in the practice of this invention for formation of the dopant solute.

1-anthracene sulfonic acid,
9-anthracene sulfonic acid,
2-phenathrene sulfonic acid,
3-phenanthrene sulfonic acid,
9-phenanthrene sulfonic acid,
$NO_2CF_3SO^-_3$,
$CF_3SO_3H$,
perfluoro octyl sulfonic acid
perfluoro octyl carboxylic acid
octylsulfonic acid,
dodecylsulfonic acid,
cetylsulfonic acid,
toluenesulfonic Acid (TsOH),
Fe(OTs)$_3$,
Fe(CH$_3$SO$_3$)$_3$,
(FSO$_3$)$_2$,
AgOTs,
Me$_3$SiOTs,
dodecylbenzene sulfonic acid,
naphthalene sulfonic acid,
benzene disulfonic acid,
benzene sulfonic acid,
1,3-benzene disulfonic acid,
2,5-dihydroxy-1,4-benzene disulfonic acid,
camphor sulfinic acid
naphthalene trisulfonic acid
dodecylbenzene sulfonic acid,
isethionic acid,
1,5-naphthalene disulfonic acid,
nickel phthalocyanine tetrasulfonic acid,
phenyl phosphonic acid,
poly(vinyl sulfonic acid),
3-sulfopropyl acrylate,
3-sulfopropyl methacrylate,
sulfamic acid,
5-sulfosalicyclic acid,
tiron (4,5-dihydroxy-1,3-benzene disulfonic acid),
vinyl sulfonic acid,
sulfanilic acid,
4-sulfophthalic acid,
sulfoacetic acid,
methyl orange,
sulfonated polystyrene,
sulfonated poly ($\alpha$-vinyl naphthalene),
naphthol yellow,
naphthol blue black,
1,2-naphthoquinone-4-sulfonic acid,
naphthylazoxine S,
1-octane sulfonic acid,
t-butyl phosphonic acid,
ethyl phosphonic acid,
butyl phosphonic acid,
1,2-benzene disulfonic acid,
4-octylbenzene sulfonic acid,
2-mesitylene sulfonic acid,
2,6-naphthalene disulfonic acid,
2-naphthalene sulfonic acid,
1,3,6-naphthalene trisulfonic acid,
1,3,7-naphthalene trisulfonic acid,
sulfonazo III acid,
biphenyl disulfonic acid,
biphenyl sulfonic acid,
1,8-dihydroxynaphthalene-3,6-disulfonic acid,
3,6-dihydroxynaphthalene-2,7-disulfonic acid,
4,5-dihydroxynaphthalene-2,7-disulfonic acid,
6,7-dihydroxy-2-naphthalene sulfonic acid,
1-naphthalene phosphoric acid,
1-naphthalene sulfonic acid,
1-naphthalene-5,7-dinitro-8-hydroxy,
1-naphthalene-4-hydroxy sulfonic acid,
4-bromo benzene sulfonic acid,
4-hydroxy-5-isopropyl-2-methyl benzene sulfonic acid
3,4-diamino benzene sulfonic acid
benzenphosphoric acid,
1,3,5-benzene trisulfonic acid,
2-methyl-5-isopropyl benzene sulfonic acid,
3,4-dinitro benzene sulfonic acid,
2-methoxy benzene sulfonic acid,
1-naphthalene-5-hydroxy sulfonic acid,
1-naphthalene-7-hydroxy sulfonic acid,
1-naphthalene-3-hydroxy sulfonic acid,
2-naphthalene-1-hydroxy sulfonic acid,
4-phenylamino benzene sulfonic acid,

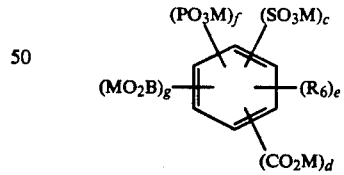

wherein:
M is a metal or non-metal cation;
c is 1, 2, 3 or 4;
d is 0, 1 or 2;
f is 0, 1 or 2;
g is 0, 1 or 2;
e is 0, 1 or 2; and
$R_6$ is nitro, cyano, hydroxy, halogen, alkoxy, phosphate, borate, carboxylate, substituted or unsubstituted aryl or alkyl having from 1 to about 30 carbon atoms wherein permissible substituents include perhaloalkyl, phenyl, alkoxy, halogen, cyano, haloalkyl, hydroxy, sulfonic acid, phosphoric acid, boric acid, sulfinate, sulfinic acid, carboxylic acid, nitro, carboxylate and the like, or any two $R_6$ substituents together may form an alkenylene chain completing a fused-ring system which chain may be unsubstituted or substituted with one or more halogen, phosphoric acid, hydroxy, boric acid, nitro, cyano, sulfinate, phosphoric acid, sulfinic acid, phosphate, carboxylate, phosphonic acid, phosphonate, sulfonate, borate, sulfonic acid or carboxylic acid groups, or $R_6$ is a moiety of the formula:

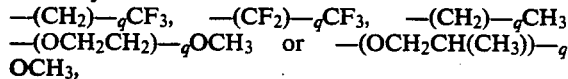

wherein:

q is a positive whole number from 1 to about 10; and

In the particularly preferred embodiment of this invention useful dopants are those of the above formula wherein:

c is 1, 2 or 3;
d is 0 or 1;
f is 0 or 1;
g is 0 or 1;
e is 0, 1 or 2; and
$R_6$ is substituted or unsubstituted phenyl or alkyl wherein permissible substituents are selected from the group consisting of alkyl, halogen, hydroxy, phenyl, haloalkyl, perhaloalkyl, cyano, nitro, alkoxy, boric acid, borate, phosphonate, phosphonic acid, carboxylate, sulfonate, phosphate, sulfonic acid, carboxylic acid, phosphoric acid, sulfinic acid or sulfinate or any two $R_6$ substituents together may form an alkylene chain completing a naphthalene, anthracene or phenathrene fused ring system or $R_5$ is a moiety of the formula:

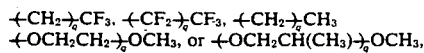

wherein:

q is a positive whole number from 1 to about 10; and
M is H+, NO+, NO$_2$ +, Fe(III), Pb(IV), Ce(IV), Al(III), Sr(IV), Cr(VI), Mn(VII), Co(III), Au(III), Os(VIII), Na(I), Li(I), K(I) or Bu$_4$N(I).

In the particularly preferred embodiments of this invention:

c is 1, 2 or 3;
d, f and g are 0;
e is 0, 1 or 2; and
$R_6$ is alkyl, phenyl, alkyl substituted with one or more fluoro, sulfonic acid, sulfonate, carboxylate, hydroxy, nitro, cyano, or carboxylic acid groups, or phenyl substituted with one or more alkyl, fluoroalkyl, sulfonic acid, sulfonate, carboxylate, hydroxy, nitro, cyano, or carboxylic groups; and
M is H+.

The amount of dopant added to the polyaniline is not critical and may vary widely. In general, sufficient dopant is added to the polyaniline to at least form doped polymer which is a semi-conductor which is a conductivity of at least about $10^{-6}$ ohm$^{-1}$cm$^{-1}$. The upper level of conductivity is not critical and will usually depend on the type of aniline polymer employed. In general, the highest level of conductivity obtained is provided without unduly adversely affecting the environment stability of the polymer. In the preferred embodiments of the invention the amount of dopant employed is sufficient to provide a conductivity of at least about $10^{-4}$ ohm$^{-1}$cm$^{-1}$, and in the particularly preferred embodiments is sufficient to provide a conductivity of from about $10^{-2}$ ohm$^{-1}$cm$^{-1}$ to about $10^{+2}$ ohm$^{-1}$cm$^{-1}$. Amongst these particularly preferred embodiments, most preferred are those embodiments in which unsubstituted polyaniline is employed and in which sufficient dopant is employed to provide a conductivity of at least about $10^{-1}$ ohm$^{-1}$cm$^{-1}$ to about $10^{+2}$ ohm$^{-1}$cm$^{-1}$ with amounts sufficient to provide a conductivity from about $10^0$ohm$^{-1}$cm$^{-1}$ to about $10^{+2}$ohm$^{-1}$cm$^{-1}$ usually being the amounts of choice.

The method of forming the thermally stable electrically conductive polyaniline is not critical and may vary widely. Suitable techniques are those described in U.S. Pat. Nos. 4,442,187 and 4,321,114. Such processes include the direct chemical polymerization of molecules of Formula 1 in the presence of chemical species as $[R_1(SO^-_3)_r]M^{+1}$, $[R_1(OPO_2\ ^-)_r]$. $M^{+1}$ $[R_1(BO_2=)_r]M^{+2}$, $R_1(BO_2H^-)M^{-1}$ and/or $[R_1(PO_3=)\ _r]M^{+2}$. Also, such process include electrochemical doping of neutral polyaniline as described in U.S. Pat. No. 4,321,114. Another process is electrochemical polymerization of aniline and its derivatives as described in Formula I in the presence of $[R_1SO_3^-]_n$ $M^{+n}$ are described in Kobayashi, Tetsuhiko, et al., *J. Electroanal. Chem.*, "Electrochemical Reactions Concerned with Electrochromism of Polyaniline Film-Coated Electrodes", 77, pp. 28-29(1984). Yet another process of forming the polyaniline of this invention involves the exchange of non-thermally stable dopants in polyaniline with a suitable dopant solute such as $R_1(SO_3\ ^-)_r$, $R_1(OPO_2\ ^-)_r$ and/or $R_1(OPOH^-)_r$. For example, in this process polyaniline can be doped by contacting same with a solution containing excess of a compound which ionizes in solution into a suitable dopant such as $R_1(SO_3\ ^-)_r\ M^{+r}$, $R_1(OPO_2\ =)_r M^{+2r}$ and $R_1(OPOH^-)_r.M^{+r}$.

Another aspect of this invention relates to a composition comprising one or more thermally stable doped electrically conductive polyanilines of this invention, and one or more thermoplastic, solution processible or thermoset polymers. One advantage of this composition is that because of the thermal stability of the polyanilines, articles can be fabricated from these compositions using conventional melt or heat processing techniques. Also, composites of these polyanilines can be used at temperatures much higher then heretofore available to conductive polyanilines. The proportion of polyaniline to thermoplastic or thermoset polymer is not critical and may vary widely, depending on the uses of the composition. For example, for those uses which require the composite having higher conductivities, i.e., up to or greater than about $10^0$ohm$^{-1}$cm$^{-1}$, the amount of electrically conductive polyaniline will tend to be relatively high, as for example up to and greater than about 10 weight percent, based on the total weight of the composition. Conversely, for those uses in which lower conductivities are required, i.e., down to or less than about $10^{-6}$ ohm$^1$cm$^{-1}$, the amount of electrically conductive polyaniline will tend to be relatively low, down to or less than about 5 weight percent based on the total weight of the composition. In the preferred embodiments of the invention, the amount of electrically conductive polyaniline is from about 1 to about 60 weight percent based on the total weight of the composition, and in the particularly preferred embodiments of the invention the amount of conductive polyaniline is from about 5 to about 40 weight percent on the aforementioned basis. Amongst these particularly preferred embodiments most preferred are those embodiments in which the composition comprises from about 5 to about 35 weight percent of the electrically conductive polyaniline based on the total weight of the composition.

Thermoset polymers for use in the practice of this invention may vary widely. Illustrative of such useful thermoset polymers are alkyds derived from the esterification of a polybasic acid such as phthalic acid and a polyhydric alcohol such as glycol; allyics such as those produced by polymerization of diallyl phthalate, diallyl isophthalate, diallyl maleate, and diallyl chlorendate; amino resins such as those produced by addition reaction between formaldehyde and such compounds as melamine, urea, aniline, ethylene urea, sulfonamide and dicyandiamide; epoxies such as epoxy phenol novolak resins, diglycidyl ethers of bisphenol A and cycloaliphatic epoxies; phenolics such as resins derived from reaction of substituted and unsubstituted phenols such as cresol and phenol with an aldehyde such as formaldehyde and acetaldehyde; polyesters; silicones; and urethanes formed by reaction of a polyisocyanate such as 2,6-tolylene disocyanate, 2,4-tolylene disocyanate, 4,4'-diphenylmethane disocyanate, 1,6-hexamethylene disoryanate and 4,4'-dicyclohexylmethane disocyanate with a polyol such as polyether polyol (trimethylol propane, 1,2,6-hexanetriol, 2-methyl glycoside, pentaerythitol, poly(1,4-tetramethylene ether) glycol, sorbitol and sucrose), polyester polyols such as those prepared by direct esterification of adipic acid, phthalic acid and like carboxylic acids with an excess of difunctional alcohols such as ethylene glycol, diethylene glycol, propanediols and butanediols.

Thermoplastic polymers for use in the formulation of the composition of this invention may vary widely. Illustrative of such polymers are polyesters such as poly(glycolic acid), poly(ethylene succinate), poly(ethylene adipate), poly(tetramethylene adipate), poly(ethylene azelate), poly(ethylene sebacate), poly(decamethylene adipate), poly(decamethylene sebacate), poly($\alpha,\alpha$-dimethylpropiolactone), poly(pivaloyl lactone), poly(para-hydroxybenzoate), poly(ethylene oxybenzoate), poly(ethylene isophthalate), poly(ethylene terephthalate), poly(decamethylene terephthalate), poly(hexamethylene terephthalate), poly(1,4-cyclohexane dimethylene terephthalate), poly(ethylene-1,5-naphthalate), poly(ethylene-2,6-naphathalate), poly(1,4-cyclohexylidene dimethyleneteraphthalate) and the like; polyamides such as poly(4-aminobutyric acid)(nylon 4), poly(6-aminohexanoic acid)(nylon 6), poly(7-aminoheptanoic acid)(nylon 7), poly(8-aminooctanoic acid)(nylon 8), poly(9-aminononanoic acid)(nylon 9), poly(10-aminodecanoic acid)(nylon 10), poly(11-aminoundecanoic acid)(nylon 11), poly(12-aminododecanoic acid)(nylon 12), poly (hexamethylene adipamide)(nylon 6,6), poly(heptamethylene pimelamide)(nylon 7,7), poly(octamethylene suberamide)(nylon 8,8), poly(hexamethylene sebacamide), (nylon 6,10), poly(nonamethylene azelamide)(nylon 9,9), poly(decamethylene azelamide)(nylon 10, 9), poly(decamethylene sebacamide)(nylon 10,10), poly[bis(4-aminocyclohexyl)methane-1,10-decanedicarboxamide] (Quiana)(trans), poly(m-xylene adipamide), poly(p-xylene sebacamide), poly(2,2,2-trimethylhexamethylene terephthalamide), poly(piperazine sebacamide), poly(metaphenylene isophthalamide)(Nomex), poly(p-phenylene terephthalamide)(Kevlar), and the like; polycarbonates such as poly[methane bis(4-phenyl)carbonate], poly[1,1-ethane bis(4-phenyl)carbonate], poly[2,2-propane bis(4-phenyl)carbonate], poly[1,1-butane bis(4-phenyl) carbonate], poly[1,1-(2-methyl propane)bis(4-phenyl) carbonate], poly[2,2-butane bis(4-phenyl)carbonate], poly[2,2-pentane bis(4-phenyl)carbonate], poly[4,4-heptane bis(4-phenyl)carbonate], poly [1,1-(1-phenylethane)bis(4-phenyl)carbonate], poly[diphenylmethane bis(4-phenyl)carbonate], poly[1,1-cyclopentane bis(4-phenyl)carbonate], poly[1,1-cyclohexane bis(4-phenyl)carbonate], poly[thio bis(4-phenyl)carbonate], poly [2,2-propane bis-[4-(2-methyl phenyl)]carbonate], poly [2,2-propane bis-[4-(2-chlorophenyl)]carbonate], poly [2,2-propane bis-[4-(2,6-dichlorophenyl)]carbonate], poly[2,2-propane bis-[4-(2,6-dibromophenyl)]carbonate], poly[1,1-cyclohexane bis-[4-(2,6-dichlorophenyl)]carbonate], and the like; polymers derived from the polymerization of $\alpha$, $\beta$-unsaturated monomers such as polyethylene, acrylonitrile/butadiene/styrene terpolymer, polypropylene, poly(1-butene), poly(3-methyl-1-butene), poly(1-pentene), poly(4-methyl-1-pentene), poly(1-hexene), poly(5-methyl-1-hexene), poly(1-octadecene), polyisobutylene, poly(isoprene), 1,2-poly(1,3-butadiene)(iso), 1,2-poly(1,3-butadiene) (syndio), polystyrene, poly($\alpha$-methylstyrene), poly(2-methylstyrene), poly(4-methylstyrene), poly(4-methoxystyrene), poly(4-phenylstyrene), poly(3-phenyl-1-propene), poly(2-chlorostyrene), poly(4-chlorostyrene), poly(vinyl fluoride), poly(vinyl chloride), poly(vinyl bromide), poly(vinylidene fluoride), poly(vinylidene chloride), poly(tetrafluoroethylene)(Teflon), poly(chlorotrifluoroethylene), poly(vinylcyclopentane), poly(vinylcyclohexane), poly($\alpha$-vinylnaphthalene), poly(vinyl alcohol), poly(vinyl methyl ether), poly(vinyl ethyl ether), poly(vinyl propyl ether), poly(vinyl isopropyl ether), poly(vinyl butyl ether), poly(vinyl isobutyl ether, poly(vinyl sec.-butyl ether), poly(vinyl tert.-butyl ether), poly(vinyl hexyl ether), poly(vinyl octyl ether), poly(vinyl methyl ketone), poly(methyl isopropenyl ketone), poly(vinyl formate), poly(vinyl acetate), poly(vinyl propionate), poly(vinyl chloroacetate), poly(vinyl trifluoroacetate), poly(vinyl benzoate), poly(2-vinylpyridine), poly(vinylpyrrolidone), poly(vinylcarbazole), poly(acrylic acid), poly(methyl acrylate), poly(ethyl acrylate), poly(propyl acrylate), poly(isopropyl acrylate), poly(butyl acrylate), poly(isobutyl acrylate), poly(sec.-butyl acrylate), poly(tert.-butyl acrylate), poly(methacrylic acid), poly(methyl methacrylate), poly(ethyl methacrylate), poly(propyl methacrylate), poly(isopropyl methacrylate), poly(butyl methacrylate), poly(isobutyl methacrylate), poly(sec.-butyl methacrylate), poly(tert.-butyl methacrylate), poly(2-ethylbutyl methacrylate), poly(hexyl methacrylate), poly(octyl methacrylate), poly(dodecyl methacrylate), poly(octadecyl methacrylate), poly(phenyl methacrylate), poly(benzyl methacrylate), poly(cyclohexyl methacrylate), poly(methyl chloroacrylate), polyacrylonitrile, polymethacrylonitrile, polyacrylamide, poly (N-isopropylacrylamide), and the like; polydienes such as poly(1,3-butadiene)(cis), poly(1,3-butadiene) (trans), poly(1,3-butadiene)(mixt.), poly(1,3-pentadiene) (trans), poly(2-methyl-1,3-butadiene)(cis), poly (2-methyl-1,3-butadiene)(trans), poly(2-methyl-1,3-butadiene) (mixt.), poly(2-tert.-butyl-1,3-butadiene) (cis), poly(2-chloro-1,3-butadiene)(trans), poly(2-chloro-1,3-butadiene) (mixt.) and the like; polyoxides such as poly(methylene oxide), poly(ethylene oxide), poly(tetramethylene oxide), poly(ethylene formal), poly(tetramethylene formal), polyacetaldehyde, poly(propylene oxide), poly(hexene oxide), poly(octene oxide), poly(trans-2-butene oxide), poly(styrene oxide), poly(3-methoxypropylene oxide), poly(3-butoxypropylene oxide), poly(3-hexoxypropylene oxide), poly(3-phenoxypropylene oxide), poly(3-chloropropylene oxide), poly [2,2-bis(chloromethyl)-trimethylene-3-oxide] (Penton), poly(2,6-dimethyl-1,4-phenylene oxide)(PPO), poly(2,6-diphenyl-1,4-phenylene oxide)(Texax, P30), and the like; polysulphides such as poly(propylene sulphide), poly (phenylene sulphide) and the like; polysulfones such as poly[4,4'-isopropylidene diphenoxy di(4-phenylene) sulphone]; noryl, and the like, and/or mixtures thereof.

The composition of this invention may include various optional components such as plasticizers, blending aids, colorants, flame-retardants and the like, or components which either fill or form a substrate for the composition to be cast from the melt or solution. These other components may vary widely and may include any material known for use in conventional polymer compositions. Illustrative of such other components are such materials as carbons, metal conductors, reinforcing fibers, inert fillers, glass beads, clays, other conductive and non-conductive polymers, conductive ceramics, super-conductive ceramics, and the like.

The composition of this invention can be prepared using conventional techniques as for example conventional melt or solution blending techniques. For example, such compositions can be formed by heating and mixing a mixture of the various components to a temperature which is equal to or greater than the melting point or flow point of at least one of the polymer components to form a molten intimate mixture to which optional components may be added as desired. Thereafter the mixture can be formed into a desired article through use of any conventional shape forming technique. For example, the molten mixture can be spread on a surface and allowed to cool forming free standing films or films coating other substitutes. The molten mixture can be extruded through a die to form films or fibers, or injection molded into a suitable mold to form molded parts having the shape of the mold. The manner in which the molten mixture is formed is not critical and conventional methods can be employed. For example, the molten mixture can be formed through use of conventional polymer and additive blending means, in which the polymeric components are heated to a temperature equal to or greater than the melting point of a least one of the polymers, and below the degradation temperature of each of the polymers. Ultrasonication can be used to improve dispersion of the non-soluble phases. The desired amount of the optional ingredients in a liquid or powdered form is added to the melted polymers while at the same time vigorously agitating the melt as for example by stirring or irradiating with ultrasound, or added prior to melting and mixing.

In a solution process for the preparation of the composition of this invention a solution of the desired host polymer in a suitable solvent with a or with out a dopant solute is formed. The desired optional components in the desired amounts may be dissolved or dispersed in the solution. The dissolved and/or dispersed polymers can be solidified into a desired shape by removal of the solvent through use of conventional techniques. For example, by removal of the solvent from a solution spread on a surface films can be formed of any desired thickness. By extruding the solution through a die, fibers and films can be made. Similarly, by removing the solvent from the solution in a mold, shaped articles comforming in shape to the mold can be prepared. If the original solution did not include a suitable dopant, the shaped article can be exposed to a suitable dopant to dope the polyaniline. In the preferred embodiments of the invention, however, doped polyaniline is used to form the solution.

In the most preferred embodiment, the components of the intimate mixture can be granulated, and the granulated components mixed dry in a suitable mixer, as for example using ultra-sonication or a tumbler or a Branbury Mixer, or the like, as uniformly as possible. Thereafter, the composition is heated and further mixed in an extruder when at least one of the polymer components is melted. As described above, the fluid mixture is thereafter ejected with cooling.

The order of mixing of the various components of the intimate mixture may not be critical. Accordingly, the order of addition of the polymers and other optional components to be desired in more detail hereinbelow, to form the intimate mixture can be varied as desired.

The electrically conductive polyaniline of the invention, and the composition of this invention can be used for any purpose for which conductive polymers are useful. Examples of articles include conductive polymer housings for EMI Shielding of sensitive electronic equipment such as microprocessors, infrared, radio frequency and microwave absorbing shields, flexible electrical conducting connectors, conductive bearings, brushes and semiconducting photoconductor junctions, electrodes, capacitors, optically transparent or non-transparent corrosion-preventing coatings for corrodible materials such as steel, antistatic materials and optically transparent or non-transparent coatings for packaging electronic components, carpet fibers, waxes for floors in computer rooms, antistatic finishes for CRT screens, aircraft, auto windows, electrostatice disapative packaging for electronics, and the like.

The following specific examples are presented to more particularly illustrate the invention, and should not be construed as being limitations on the scope and spirit of the invention.

EXAMPLE 1

Preparation of Poly(aniline hydrogen chloride)

Aniline, (10 ml, 0.11 m); concentrated hydrochloric acid, (33.76 ml., 0.35 m); thirty percent hydrogen peroxide, (12.5 ml., 0.11 m); and ferrous sulfate heptahydrate (100 mg.) together in 400 ml. deionized water. The reactants were cooled overnight without stirring at 4° C.

The resulting finely precipitated solids were filtered, washed twice with 100 ml. deionized water, then air dried 16 hours. The conductivity of a pressed pellet 1 cm. in diameter was 10.2 S/cm as measured by a four-point probe conductivity apparatus. Thermogravimetric analysis (TGA) from 30° to 700° C. under argon at a heating rate of 10° C./minute was performed using a Perkin-Elmer TGS-2. Significant weight loss was noted beginning at room temperature up to 125° C. with a second major weight loss step occurring at 175° C. (See FIG. 1).

EXAMPLE 2

Preparation of Poly(aniline 1,5-Naphthalenedisulfonate)

A suspension of 50 ml. aniline (0.538 m) and 273 g. 1,5-naphthalenedisulfonic acid, tetrahydrate (0.758 m) in 2250 ml. deionized water was cooled to 14° C. A solution of 163 g. ammonium persulfate (0.714 m) in 400 ml water was added all at once.

The reaction was slow to initiate, taking an hour overall. It reached a maximum temperature of 24° C. and a maximum potential of 0.745 volts as measured using a platinum electrode vs a Ag/AgCl reference electrode connected to a Keithley 168 digital multimeter. As the reaction neared completion, the potential fell to 0.5 volts. The color of the solution was blue/black; and the solution was full of suspended solids. After stirring for an additional 30 minutes, the reaction mixture was filtered, and the filter cake washed 4 times with 200 ml portions of water at 50° C.

The semi-dry cake was resuspended in one liter of water containing 12 g. dissolved 1,5-naphthalenedisulfonic acid, tetrahydrate. After stirring 30 minutes the acid solution was filtered and the filter cake washed 2 times with 300 ml portions of water at 50° C. and 5 times with 200 ml portions of methanol at 20° C.

The solids were added to one liter of methanol containing 11,5-naphthalenedisulfonic acid tetrahydrate (12 g) and stirred 30 minutes. After filtering, the filter cake was washed 3 times with 200 ml portions of methanol. The solids were dried in air overnight and then under vacuum (0.1 mm Hg) 80° C. at for three hours.

Figure 2:
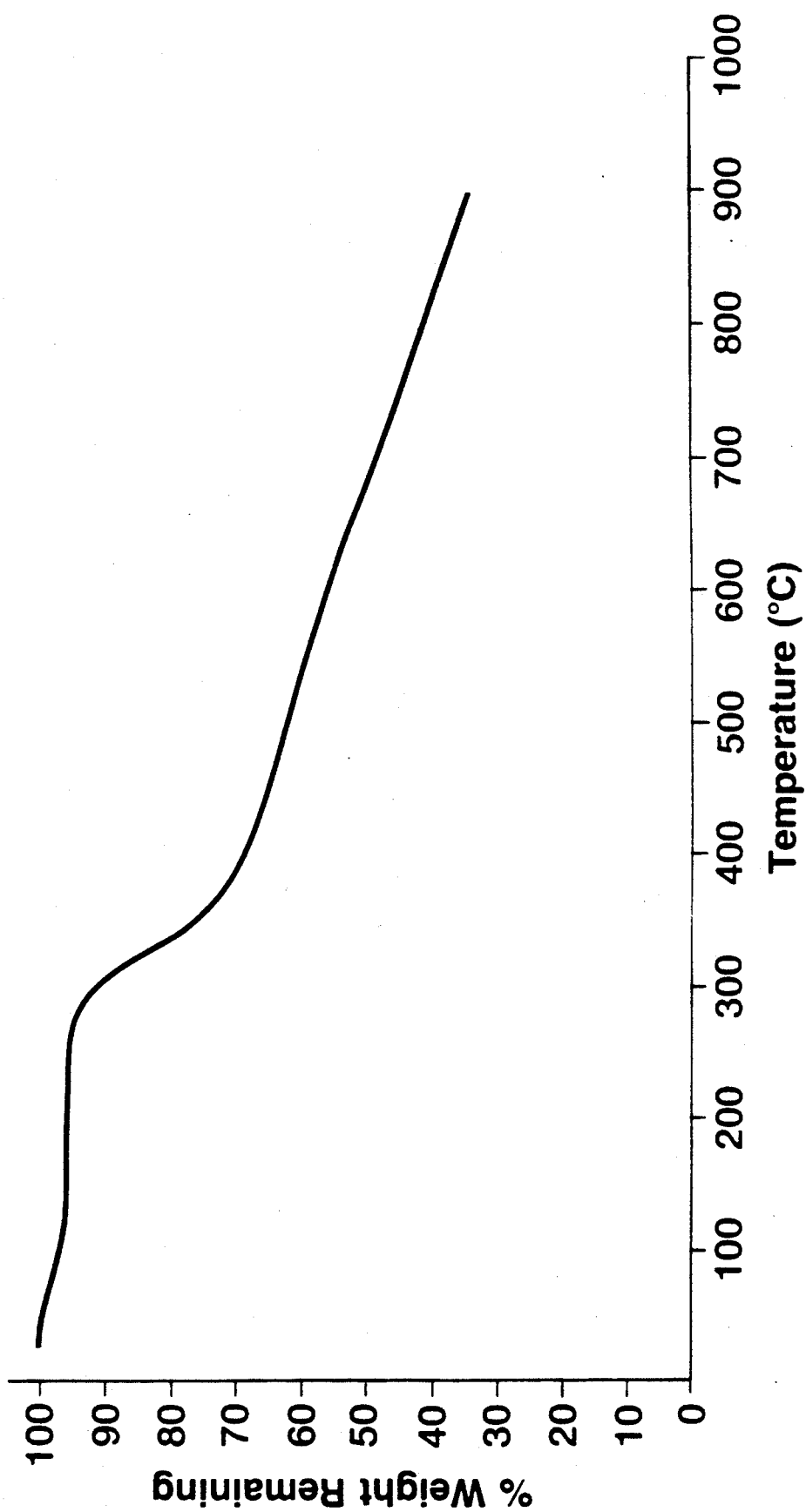
FIG. 2 is a thermogravimetric analysis (TGA) spectrum under argon of poly(aniline 1,5-naphthalene disulfonate) as prepared in Example 2.

A pressed pellet of this dark blue-green powder exhibited a conductivity of 0.21 S/cm. The TGA in argon shows that weight loss begins at temperatures slightly above 275° C. (See FIG. 2).

EXAMPLE 3

Preparation of Poly(aniline p-toluene sulfonate)

Two separate solutions were prepared. Solution A contains aniline (155 g, 1.67 m) and methanesulfonic acid (241 g, 2.5 m) in 1.67 liters of deionized water.

Solution B contains ammonium persulfate (571 g 2.5 m) dissolved in 1.67 liters of deionized water.

Solution B was added to Solution A with stirring at a rate sufficient to maintain the temperature of the reaction mixture below 50° C. The suspension was stirred overnight. The solids were collected by filtration and were washed with 3.7 liters of water at 50° C. The solids were resuspended in 6.2 liters of water. To the suspension was added 300 ml. of concentrated ammonium hydroxide was added with stirring to neutralize the polymer. After 30 minutes the solids were collected by filtration and washed with 3.7 liters of water at 50° C. The neutral polymer was resuspended in 3.1 liters of water containing 310 g of p-toluene-sulfonic acid. The re-doped polymer slurry was stirred for three hours, filtered and washed with 500 ml of methanol.

Figure 3:
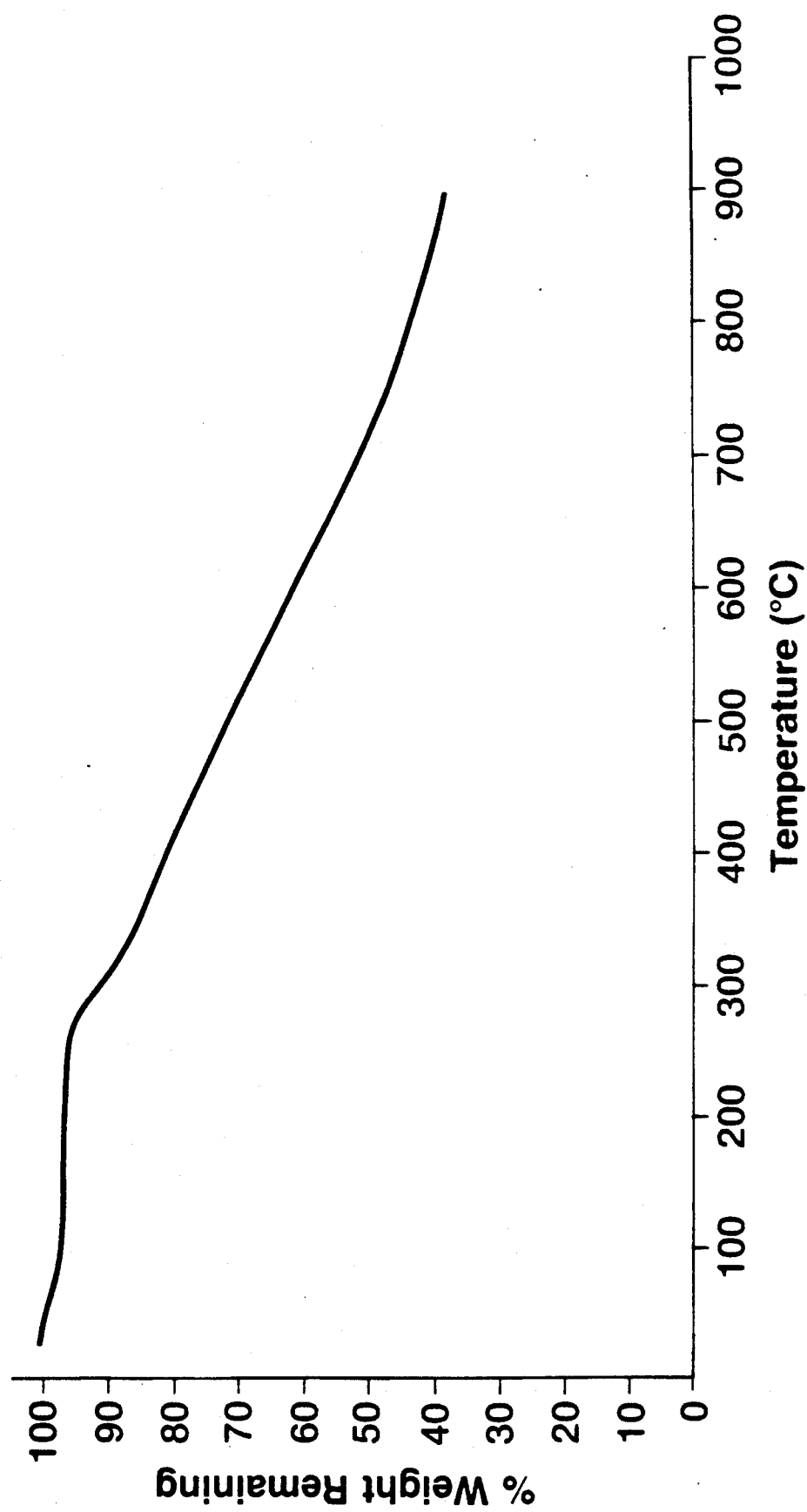
FIG. 3 is a thermogravimetric analysis (TGA) spectrum under argon of poly(aniline p-toluene sulfonate) as prepared by redoping neutral polyaniline (Example 3).

After drying under vacuum overnight at 80° C., the powder was measured for conductivity as in Example 1, which was found to be 0.25 S/cm. TGA in argon indicates little weight loss occurs below 260° C. (See FIG. 3)

EXAMPLE 4

Preparation of Poly(aniline p-toluene sulfonate)

Aniline (50 ml, 0.5367 m) and p-toluene sulfonic acid, (144 g., 0.758 m) were charged into a 4 liter beaker containing 2250 ml deionized water at 30° C. The potential of the reactants were monitored by immersion of a platinum wire and a reference Ag/AgCl electrode. Ammonium persulfate (123 g., 0.539 m) dissolved in 300 ml water was added all at once. As the reaction progressed, the temperature reached 46° C. and the potential went as high as 0.74 volts.

Fifteen minutes after the reaction potential peaked and fell, a further 40 g. of ammonium persulfate (0.175 m) dissolved in 100 ml water was added dropwise at a rate which maintained the reaction mixture at a steady potential of 0.62 volts.

The suspension was filtered and the filter cake washed under suction with six times with 200 ml portions of deionized water. The solids were then resuspended in one liter of water containing 20 g. of p-toluenesulfonic acid and stirred at room temperature for one hour. After filtration, the filter cake was again washed under suction six times with 200 ml portions of 2% p-toluenesulfonic and stirred for 30 minutes. This slurry was filtered and the filter cake washed three times with 200 ml of acetone.

Figure 4:
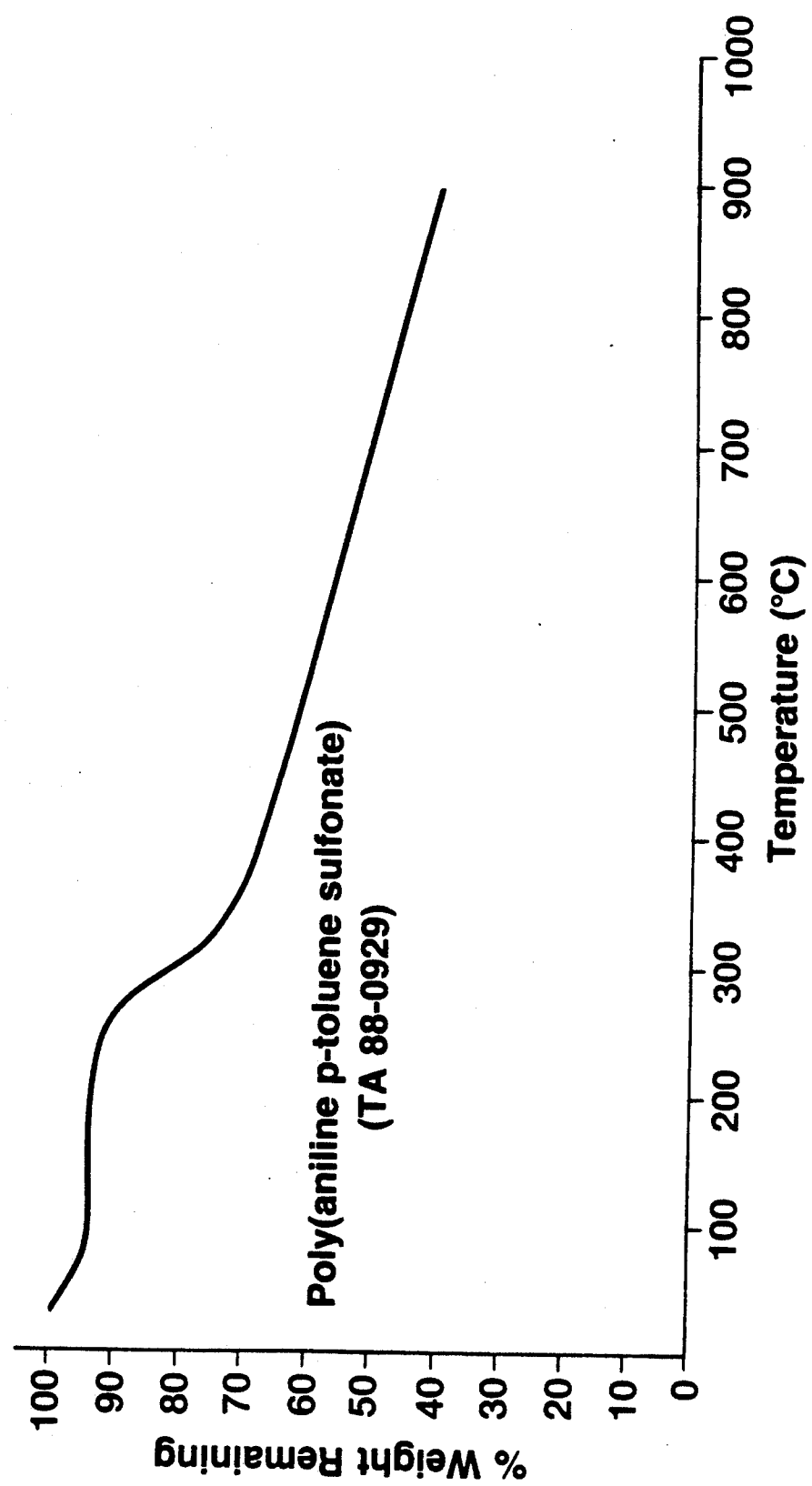
FIG. 4 is a thermogravimetric analysis (TGA) spectrum under argon of poly(aniline p-toluene sulfonate) as prepared in Example 4.

The solids were dried overnight at room temperature under vacuum, then two hours at 80° C. under vacuum. Pellets pressed from this dry powder and measured as in Example 1 had conductivities of at least 1.0 S/cm. The TGA of this material, as run by the method in Example 1, shows that major weight loss occurs only at temperatures above 225° C. (See FIG. 4).

EXAMPLE 5

Preparation of Poly(aniline dodecylbenzenesulfonate)

Aniline (1.7 g.) was added to 9.0 g. of decylbenzenesulfonic acid (1.5 equivalents based on aniline) dissolved in 50 ml. of deionized water at room temperature. To this creamy mixture was added 6.3 g. of ammonium persulfate (1.5 equivalents based on aniline) all at once.

Figure 5:
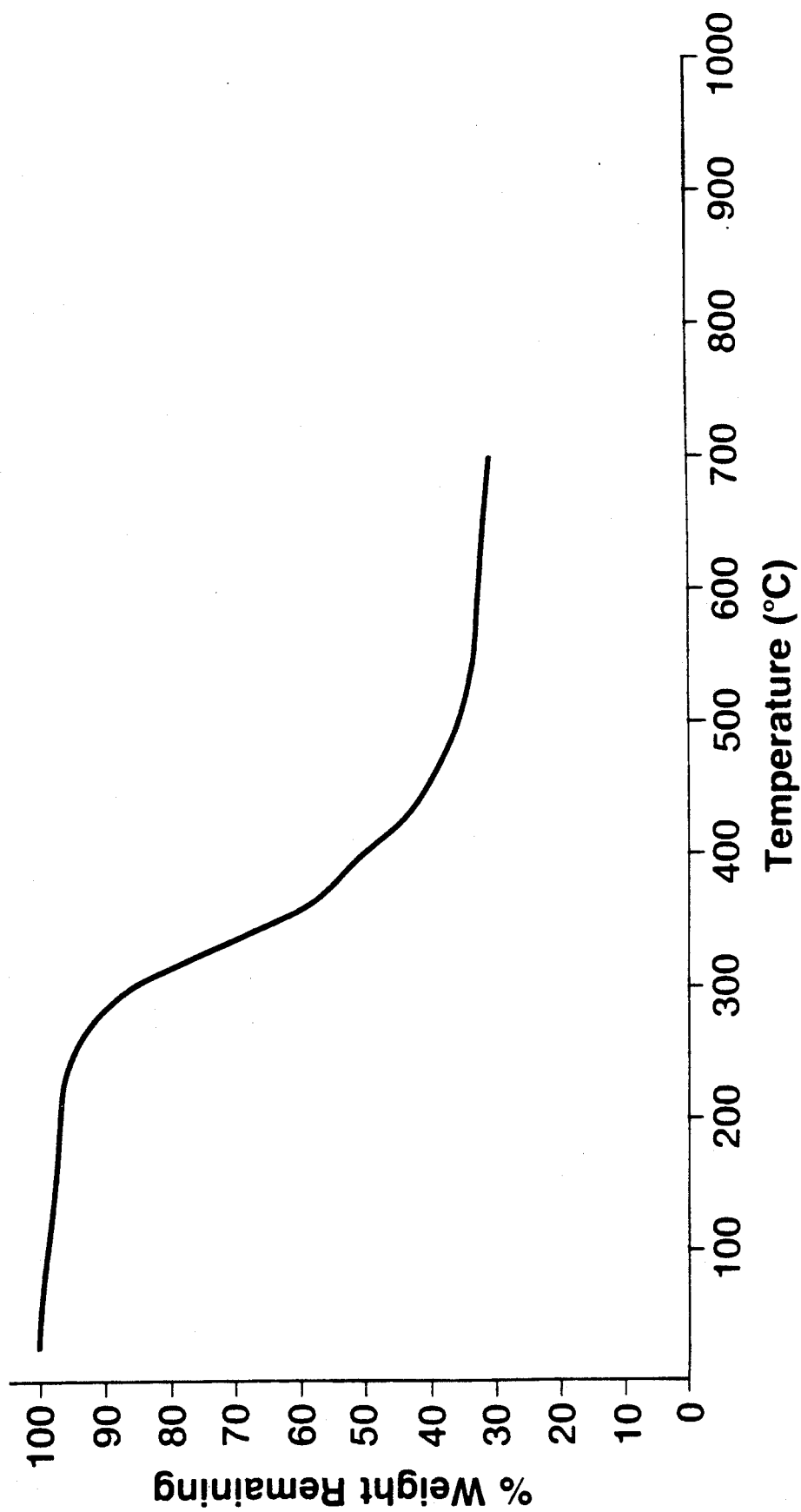
FIG. 5 is a thermogravimetric analysis (TGA) spectrum under argon of poly(aniline dodecyl-benzene sulfonate) as prepared in Example 5.

After 30 minutes a smooth blue/green suspension formed. The solids were filtered, washed with 3 times with 50 ml. portions of water, and then air dried. The solids were tested for conductivity as in Example 1. Conductivity of the pellet was 0.19 S/cm. A TGA of the material run under the parameters of Example 1 shows that major weight loss only begins at temperatures above 225° C. (See FIG. 5).

EXAMPLE 6

Preparation of Poly(aniline hydrogen sulfate: 1,3-benzenedisulfonate)

Aniline (50 g. 0.5365 m) and 1,3-benzenedisulfonic acid disodium salt (95.1 g. 0.337 m) were charged into 2250 ml.) water in a 4L beaker at ambient temperature. The reaction potential was monitored as in Example 2.

Ammonium persulfate (157 g. 0.688 m) was added all at once. The reaction had induction period of twenty minutes. Once underway, the reaction proceeded quickly (3–4 minutes). The temperature rose to a maximum of 46° C. and the potential peaked at 0.735 volts. The reactants were stirred overnight at room temperature.

After filtration, the solids were resuspended in 1.3 liters of deionized water containing 5% sulfuric acid and 1.67% 1,3-benzenedisulfonic acid disodium salt and the suspension stirred for 30 minutes. The solids were collected by filtration and resuspended in one liter of water containing 3% sulfuric acid and 1% 1,3-benzenedisulfonic acid, disodium salt. After stirring for an hour, this suspension in turn was filtered and the solids were added to a liter of water containing 1% sulfuric acid and 0.5% 1,3-benzenedisulfonic acid, disodium salt. The solids were stirred and then collected by filtration.

Figure 6:
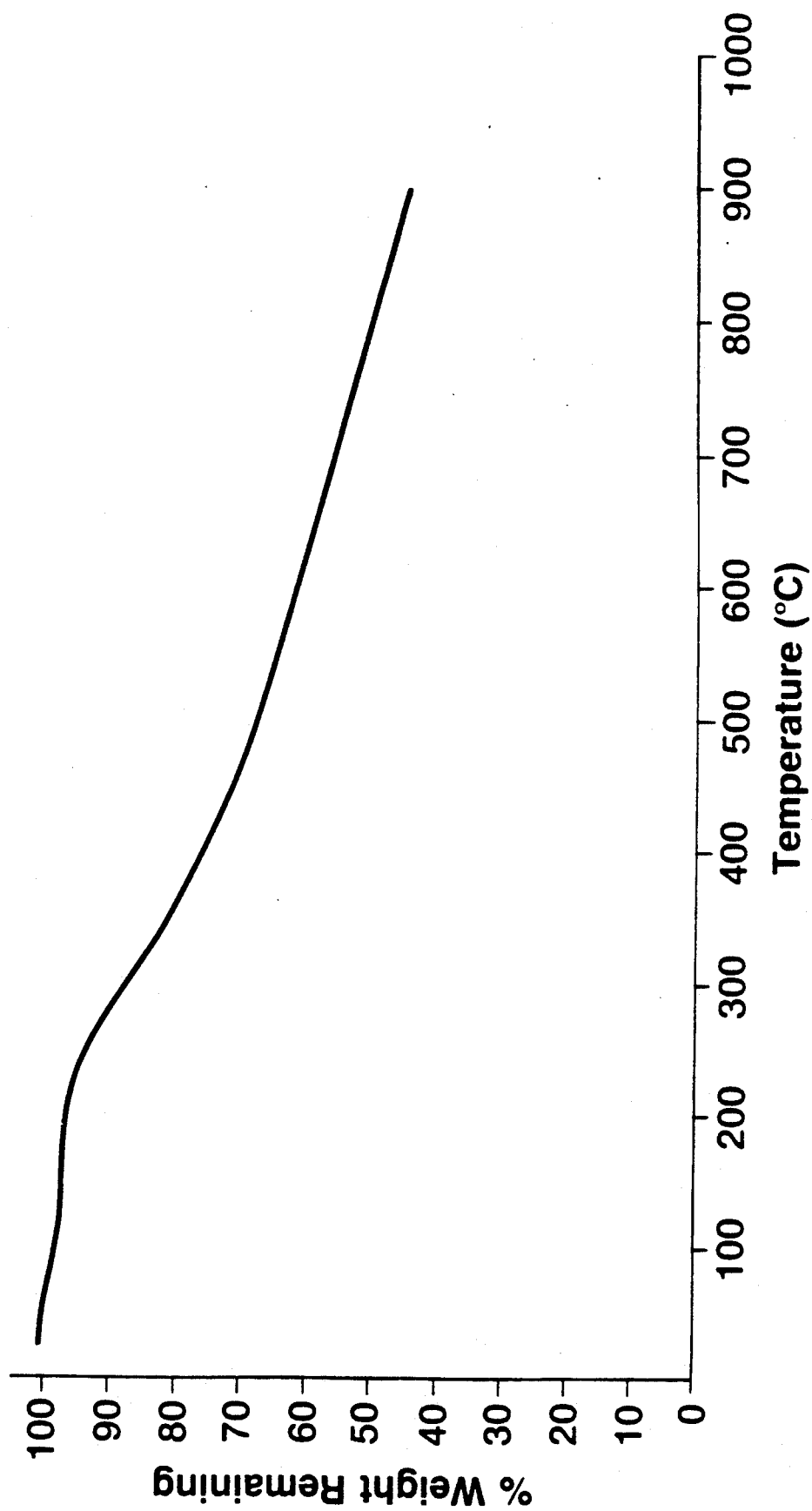
FIG. 6 is a thermogravimetric analysis (TGA) spectrum under argon of poly(aniline 1,3-benzene disulfonate) as prepared in Example 6.

The solids were air dried overnight, then heated under vacuum (0.1 mm Hg) at 80° C. for two hours. Conductivity of a pellet measured as described in Example 1 was 1.57 S/cm. The TGA shows that major weight loss does not occur at temperature below 200° C. (see FIG. 6).

EXAMPLE 7

Preparation of Poly(aniline sulfamate)

Poly(aniline/hydrogen chloride) from Example 1 was suspended in water and neutralized with an excess of ammonium hydroxide as in Example 3. The neutral polyaniline was washed with water and dried under vacuum.

Neutral polyaniline, (2 g) was added to 100 ml of deionized water in a 600 ml beaker. Sulfamic acid 9.7 g. 0.1 m) was added with stirring. The contents were allowed to mix overnight at room temperature. The solids were then filtered, and washed as in Example 6 using the following sulfamic acid solutions: a 5% aqueous sulfamic acid solution, a 3% aqueous sulfamic acid solution, and a 1% aqueous sulfamic acid solution. The solids were then washed with $2 \times 50$ ml portions of methanol, and dried under vacuum at 80° C. for 2 hours.

Figure 7:
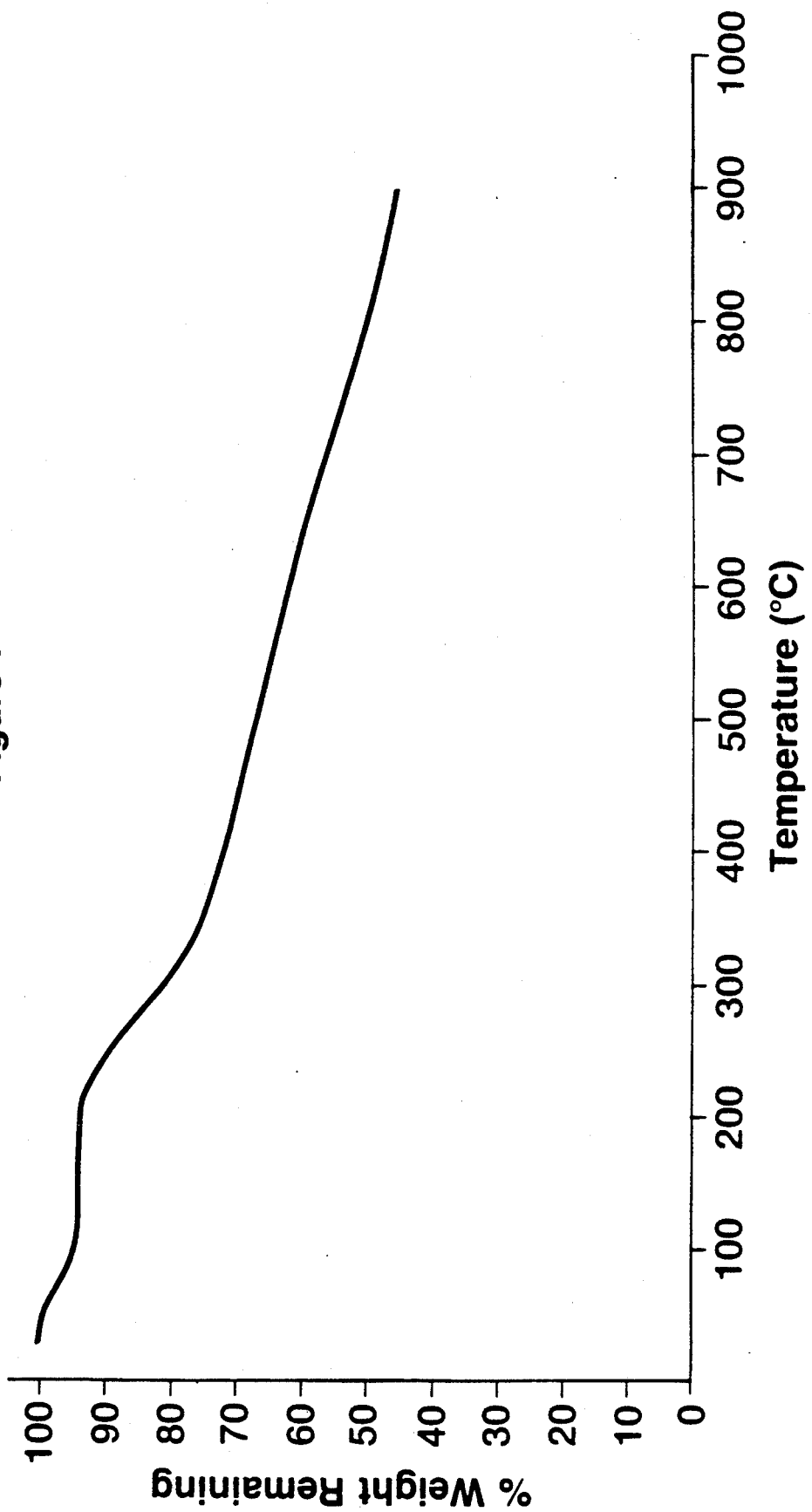
FIG. 7 is a thermogravimetric analysis (TGA) spectrum under argon of poly(aniline-sulfonate) as prepared in Example 7.

Conductivity of a pressed pellet was 0.83 S/cm. The TGA shows that no major weight loss occurs below 200° C. (See FIG. 7).

EXAMPLE 8

Preparation of Thermally Stable Conductive Polyaniline Containing p-Toluenesulfonate Anion as Dopant To 0.05 mole of p-toluene sulfonic acid hydrate in 100 mL of water was added 0.05 mole of aniline. To this solution at 0° C. was then added 0.075 mole of ammonium persulfate in 20 mL of water. After stirring for 20 min., the yellow solution was allowed to warm to room temperature and stirring was continued for another 16 hr. The green precipitate was filtered, washed twice with a 0.1M p-toluenesulfonic acid solution in water, three times with water, then twice with methanol, then air dried. Yield was 2.6 g. A compacted-powder pellet, 12.7 mm diameter by 1 mm thick, exhibited a 4-probe conductivity of 0.7 S/cm ($ohm^{-1}cm^{-1}$). Elemental analysis gave 64.03%C, 5.42%H, 9.43%N, 7.44%S, and 12.02% O. Empirical formula: $C_6H_4N_1$ $(OTs)_{0.27}$($HSO_4)_{0.07}$ (OTS=p-toluenesulfonic acid). Thermogravimetric analysis (TGA) under argon shows only a 2% wt loss up to 300° C. and a 5% wt loss up to 400° C. Major weight loss begins at 425° C. with 55% of the original weight remaining at 700° C.

EXAMPLE 9

Preparation of p-Toluenesulfonate Doped Polyaniline by Treatment of the Emeraldine Base Form of Polyaniline with p-Toluenesulfonic Acid To 50 mL of a 1M p-toluenesulfonic acid solution in water was added 1.0 g of the Emeraldine base form of powdered polyaniline. The suspension was stirred for 1 hour at room temperature, filtered, washed twice with 1M p-toluenesulfonic acid, twice with water (25 mL), then twice with methanol, and air dried. A compacted-powder pellet 12.7 mm dia. $\times$ 1 mm thick gave four-probe conductivity of 0.5 S/m. TGA analysis on this material showed similar weight loss behavior to that of material prepared as in Example 8.

EXAMPLE 10

Preparation of p-Toluenesulfonate Doped Polyaniline by Exchange of Dopant Ion in Polyaniline Hydrochloride with p-Toluene Sulfonate Anion To 50 mL of 1M p-toluene sulfonic acid solution in water was added 1.0 g of polyaniline hydrochloride (original conductivity of 5 S/cm). The suspension was stirred for one day at room temperature, filtered and the solid was washed with 1M toluene sulfonic acid solution then water and air-dried. A compacted pellet exhibited a 4-probe conductivity of 0.5 S/cm. TGA analysis show similar weight loss behavior as that of sample from Example 9.

EXAMPLE 11

(A) Preparation of Polyaniline Chloride

Into a one liter erlenmeyer flask equipped with a magnetic stirring bar was placed 750 mL of 1M HCl and 29 g of distilled aniline. After the aniline dissolved, a solution of 35.6 g of ammonium persulfate in 80 mL of water was added with cooling. After three hours at room temperature, the dark solids were filtered, washed three times with mL of 1M HCl, twice with 200 mL water, and once with 200 mL of methanol. The solids were air dried to give 13 g of polyaniline chloride. A pressed pellet 7 mm diameter by 1 mm thickness exhibited a 4-point probe conductivity of 10.2 S/cm.

(B) Thermal Studies on Polyaniline Chloride

One gram of the above polyaniline chloride with a conductivity of 10.2 S/cm was heated to 100° C. under vacuum for 2 hours. The sample lost 14% of its weight and its conductivity (pressed pellet, 4-point probe) dropped to 0.7 S/cm.

Another 1 gram sample was heated to 200° C. under vacuum for 2 hours. This sample lost 24% of its weight and its conductivity (pressed pellet, 4-point probe) dropped to $7 \times 10^{-7}$ S/cm.

COMPARATIVE EXAMPLE I

Thermogravimetric Analyses (TGA) of Polyaniline Chloride and Polyaniline Tosylate An experiment was carried out to compare the thermal stability of the thermally stable polyaniline of this invention and conventional doped polyaniline. The polyaniline of this invention was doped with tosylate anions and was prepared as described in Example I. The conventional polyaniline was doped with chloride anions and was prepared as in Comparative Examples I.

Samples of polyaniline chloride and polyaniline tosylate were analyzed by TGA under argon to determine their stability to weight loss (dopant loss). The results of this experiment are set forth in FIGS. 8, 1 and 9. At a 10° C./min heating rate, the sample of polyaniline chloride exhibited two weight-loss steps, one between room temperature and 100° C. (11% wt loss) and the other between 125° C. and 300° C. (dopant loss) (14% wt loss). (See FIG. 8) Subjecting a sample of polyaniline tosylate to the same analysis showed that it did not loose any weight up to 300° C. (See FIG. 9).

What is claimed is:

1. A thermally stable electrically conductive homopolymer or copolymer comprising a substituted or unsubstituted polyaniline derived from polymerizing an aniline of the formula:

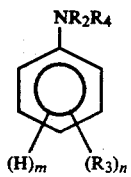

having therein a dopant solute selected from the group consisting of:

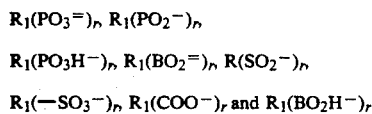

in an amount sufficient to provide a doped polyaniline having a conductivity of at least about $10^{-6}$ ohm$^{-1}$cm$^{-1}$ wherein:

$R_1$ is the same or different at each occurrence and is a substituted or unsubstituted organic radical, amino, alkylamino, dialkylamino, arylamino, diarylamino, or alkylarylamino;

n is an integer from 0 to 4;

m is an integer from 1 to 5 with the proviso that the sum of n and m is 5;

r is an integer equal to or greater than 1;

$R_2$ and $R_4$ are the same or different at each occurrence and are $R_3$ substituents, hydrogen or alkyl; with the proviso that at least one of $R_2$ or $R_4$ is hydrogen and with the further proviso that $R_2$ and $R_4$ are not alkylsulfonyl, arylsulfonyl or alkanoyl;

$R_3$ is deuterium, alkyl, alkenyl, alkoxy, cycloalkyl, hydroxy, cycloalkenyl, alkanoyl, alkylthio, aryloxy, alkylthioalkyl, alkylaryl, arylalkyl, alkylsulfinyl, alkoxyalkyl, alkylsulfonyl, aryl, arylthio, arylsulfinyl, alkoxycarbonyl, alkylsilane, phosphinic acid, arylsulfonyl, phosphonic acid, sulfonic acid, boric acid, phosphoric acid, sulfonate, borate, phosphonate, phosphinate, phosphate, sulfinic acid, sulfinate, carboxylic acid, halo, carboxylate, cyano, or alkyl or alkoxy substituted with one or more phosphonic acid, sulfonic acid, boric acid, sulfinic acid, sulfinate, phosphoric acid, sulfonate, borate, carboxylate, phosphonate, phosphate, carboxylic acid, halo, hydroxy, cyano or epoxy moieties; or any two $R_3$ substituents or any one $R_3$ substituent and any one $R_2$ or $R_4$ substituent taken together may form an alkylene or alkenylene chain completing a 3, 4, 5, 6 or 7 membered aromatic or alicyclic carbon ring, or any two $R_3$ substituents or any one $R_3$ substituent and any one $R_2$ or $R_4$ substituent taken together may form an alkylene or alkenylene chain completing a 3, 4, 5, 6 or 7 membered aromatic or alicyclic carbon ring which includes one or more divalent ester, carbonyl, nitrogen, sulfur, sulfinyl, sulfonyl or oxygen, or $R_3$ is an aliphatic moiety having repeat units of the formula:

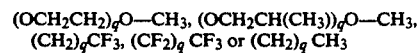

wherein q is a positive whole number; with the proviso that the homopolymer or copolymer includes 10 or more recurring aromatic moieties.

2. The homopolymer or copolymer according to claim 1 wherein said homopolymer or copolymer is of the formula:

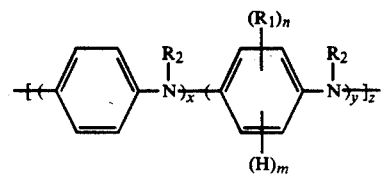

or

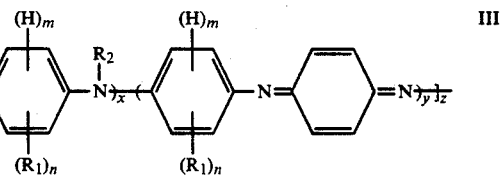

or

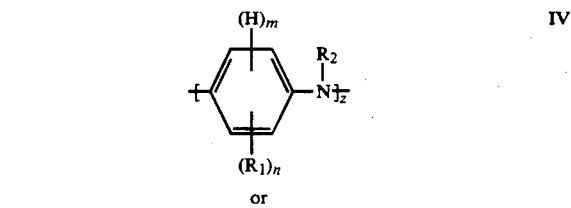

or

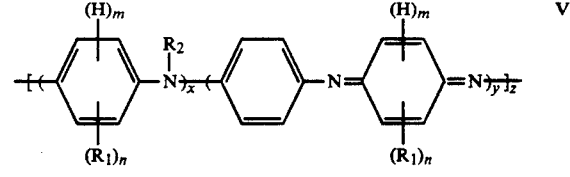

wherein:

x is an integer equal to or greater than 1;

y is equal to or greater than 1, with the proviso that the ratio of x to y is greater than about 0.5;

z, v and u are the same or different and are equal to or greater than about 1;

n is an integer from 0 to 4;

m is an integer from 1 to 5 with the proviso that the sum of n and m is 5;

$R_2$ and $R_4$ are the same or different at each occurrence and are $R_3$ substituents, hydrogen or alkyl;

$R_3$ is the same or different at each occurrence and is alkyl, alkenyl, alkoxy, cycloalkyl, cycloalkenyl, alkanoyl, alkylthio, aryloxy, alkylthioalkyl, alkylaryl, arylalkyl, alkylsulfinyl, alkoxyalkyl, alkylsulfonyl, aryl, arylthio, arylsulfinyl, alkoxycarbonyl, phosphinic acid, phosphonic acid, alkylsilane, boric acid, arylsufonyl, carboxylic acid, halo, hydroxy, phosphate, sulfonate, phosphonate, borate, phosphinate, carboxylate, cyano, sulfonic acid, phosphoric acid or alkyl or alkoxy substituted with one or more sulfonic acid, carboxylic acid, sulfinate, phosphoric acid, boric acid, sulfinic acid, halo, cyano, epoxy, hydroxy, sulfonate, phosphate, phosphonate, phosphinic acid, phosphinate, carboxylate, phosphonic acid or borate moieties; or any two $R_3$ substituents or any one $R_3$ group and any $R_2$ or $R_4$ group together may form an alkylene or alkenylene chain completing a 3, 4, 5, 6 or 7 membered aromatic or alicyclic carbon ring or any two $R_3$ substituents or any one $R_3$ substituent and any one $R_2$ or $R_4$ substituent taken together may form an alkylene or alkenylene chain completing a 3, 4, 5, 6 or 7 membered aromatic or alicyclic carbon ring which includes one or more divalent nitrogen, ester, carbonyl, sulfur, sulfinyl, sulfonyl, or oxygen.

3. The homopolymer or copolymer according to claim 1 wherein m is from about 3 to about 5.

4. The homopolymer or copolymer according to claim 3 wherein m is from about 4 to about 5.

5. The homopolymer or copolymer according to claim 1 wherein said polyaniline is derived from substituted anilines.

6. The homopolymer or copolymer according to claim 1 wherein said polyaniline is derived from unsubstituted aniline.

7. The homopolymer or copolymer according to claim 2 wherein $R_3$ is the same or different at each occurrence and is alkyl or alkoxy having from 1 to about 30 carbon atoms, cyano, halo, hydroxy, or alkyl or alkoxy substituted with carboxylic acid, phosphoric acid, phosphinic acid, phosphinate, boric acid, carboxylate, sulfinic acid, sulfonic acid, sulfonate, sulfinate, phosphonate, phosphate, phosphoric acid or borate substituents.

8. The homopolymer or copolymer according to claim 7 wherein $R_3$ is the same or different at each occurrence and is alkyl or alkoxy having from 1 to about 20 carbon atoms, or substituted alkyl or alkoxy having from 1 to about 20 carbon atoms wherein permissible substituents are alkyl, carboxylic acid, sulfonic acid, phosphoric acid, boric acid, sulfinate, sulfonate, phosphonate, phosphate, carboxylate, phosphonic acid or borate substituents.

9. The homopolymer or copolymer according to claim 8 wherein $R_3$ is the same or different at each occurrence and is alkyl having from 1 to about 4 carbon atoms.

10. The homopolymer or copolymer according to claim 7 wherein n is 0, 1, 2, 3 or 4.

11. The homopolymer or copolymer according to claim 10 wherein n is 0, 1, 2 or 3.

12. The homopolymer or copolymer according to claim 11 wherein n is 0 or 1.

13. The homopolymer or copolymer according to claim 2 wherein $R_3$ is alkoxy, alkyl, halo, phenyl, haloalkyl, perhaloalkyl, cyano, or alkoxy, alkyl or phenyl substituted with one or more alkoxy, sulfonic acid, carboxylic acid, boric acid, phosphoric acid, hydroxy, fluoro, cyano, sulfinic acid, carboxylate, sulfonate, sulfinate, phosphonate, phosphate, phosphoric acid or borate or an aliphatic moiety of the formula:

$-(OCH_2CH_2)_qOCH_3$ or $-(OCH_2CH(CH_3))_qOCH_3$ wherein q is a positive whole number.

14. The homopolymer or copolymer according to claim 13 wherein:

$R_3$ is fluoro, or substituted or unsubstituted alkyl, alkoxy or phenyl wherein permissible substituents are one or more fluoro, sulfonic acid, phosphoric acid, sulfinic acid, phosphonate, phosphate, sulfonate, borate, phosphonic acid, boric acid, carboxylic acid, carboxylate, hydroxy or cyano.

15. The homopolymer or copolymer according to claim 14 wherein:

$R_3$ is fluoro, alkyl or alkyl or alkoxy substituted with one or more carboxylic acid, sulfonic acid, phosphonate, carboxylate, phosphate, sulfonate, borate, sulfinic acid, sulfinate, phosphonic acid, phosphoric acid, boric acid, fluoro or nitro substituents wherein the aliphatic moiety contains from about 1 to about 30 carbon atoms, or $R_3$ phenyl or phenyl substituted with one or more substituents selected from the group consisting of fluoro, alkyl or alkyl substituted with one or more fluoro, cyano, carboxylic, sulfonic, borate, carboxylate, sulfinic acid, sulfinate, sulfonate, phosphate, phosphoric acid or boric acid moieties.

16. The homopolymer or copolymer of claim 1 wherein $R_1$ is alkyl or substituted alkyl.

17. The homopolymer or copolymer according to claim 1 wherein said dopant is a compound of the formula:

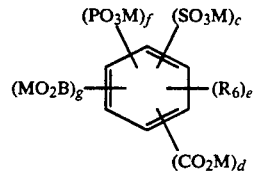

wherein:

M is $H^+$, a metal cation or non-metal cation;

c is 0, 1, 2, 3 or 4;

e is 0, 1 or 2;

f is 0, 1 or 2;

g is 0, 1 or 2;

d is 0, 1 or 2; and $R_6$ is hydroxy, alkyl, halo, cyano, phosphonic acid, phosphonate, phosphinic acid, phosphinate, alkoxy, hydroxy, sulfinic acid, sulfinate, or substituted or unsubstituted aryl or alkyl having from 1 to about 30 carbon atoms wherein permissible substituents are perhaloalkyl, halo, cyano, phosphonate, borate, phosphonic acid, sulfonate, carboxylate, phosphate, haloalkyl, sulfonic acid, sulfinic acid, sulfinate, phosphoric acid, boric acid, carboxylic acid, or any two $R_6$ substituents together may form an alkenylene chain completing a fused aromatic ring system, which chain may be unsubstituted or substituted with one or more halo, hydroxy, phosphonate, borate, phosphonic acid, sulfonate, phosphate, boric acid, phosphoric acid, carboxylate, cyano, sulfonic acid or carboxylic acid groups, or $R_6$ is an aliphatic moiety of the formula:

$-(OCH_2CH_2)_qOCH_3$ or $-(OCH_2CH(CH_3))_qOCH_3$ wherein q is 1 to about 10.

18. The homopolymer or copolymer according to claim 17 wherein said dopant is a compound of the formula:

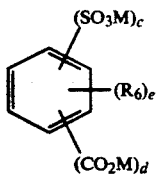

wherein:
M is H+;
c is 1, 2 or 3;
d and e are the same or different and are 0, 1 or 2; and
$R_6$ is hydroxy, cyano, halo or substituted or unsubstituted alkyl having from 1 to about 30 carbon atoms phenyl or phenylalkyl having from 7 to about 30 carbon atoms wherein permissible substituents are halo, alkyl, alkoxy, cyano, boric acid, phosphoric acid, phosphate, borate, phosphonate, sulfonate, phosphonic acid, sulfonic acid, carboxylate and carboxylic acid groups or any two $R_6$ groups may form a divalent substituted or unsubstituted alkenylene chain completing a naphthalene, anthracene or phenanthraene-fused ring structure, which chain may be substituted with one or more hydroxy, cyano, halo, sulfonic acid, boric acid, phosphoric acid, alkyl, alkoxy, sulfinate, phosphate, borate, phosphonate, carboxylate, phosphonic acid, phosphonate, sulfonate, boric acid, borate, sulfinic acid, phosphoric acid, phosphate, sulfonate, phosphonic acid, carboxylic acid or alkyl substituted with one or more carboxylic acid, sulfonic acid or fluoro groups.

19. The homopolymer or copolymer according to claim 18 wherein:
M is H+;
c is 1, 2 or 3;
d and e are the same or different and are 0, 1 or 2; and
$R_6$ is alkyl having from 1 to about 15 carbon atoms, fluoro, alkyl substituted with one or more fluoro, cyano, boric acid, phosphoric acid, phosphate, carboxylate, borate, phosphonate, sulfonate, sulfinic acid, sulfinate, phosphonic acid, sulfonate, sulfonic acid or carboxylic acid group; or any two $R_5$ groups together may form a substituted or unsubstituted divalent alkenylene chain completing a naphthalene, anthracene or phenanthrene structure where permissible substituents are one or more sulfonic acid, boric acid, phosphoric acid, phosphate, borate, sulfinic acid, sulfinate, phosphonate, carboxylate, sulfonate, phosphonic acid, fluoro, carboxylic acid, or alkyl substituted with one or more fluoro, sulfonic acid, carboxylate, phosphonic acid, phosphonate, sulfonate, boric acid, borate, phosphoric acid, phosphate, or carboxylic acid groups.

20. The homopolymer or copolymer according to claim 18 wherein:
M is H+;
c is 1, 2 or 3;
d is 0;
e is 0, 1 or 2; and
$R_6$ is alkyl, fluoro or alkyl substituted with one or more fluoro substituents or any two $R_5$ group together may form a substituted or unsubstituted divalent alkenylene chain completing a naphthalene, anthracene or phenanthracene ring structure, wherein permissible substituents are one or more sulfonic acid, fluoro or alkyl substituted with one or more sulfonic acid or fluoro groups.

21. The homopolymer or copolymer according to claim 2 wherein z is equal to or greater than about 5.

22. The homopolymer or copolymer according to claim 21 wherein z is equal to or greater than about 10.

23. The homopolymer or copolymer according to claim 22 wherein said polyaniline is of the Formulas III or V.

24. The homopolymer or copolymer according to claim 23 wherein x is equal to or greater than about 2, with the proviso that the ratio of x to y is at least about 2.

25. The homopolymer or copolymer according to claim 24 wherein x is from about 4 to about 8 and y is from about 0 to about 2, with the proviso that the ratio of x to y is at least about 2.

26. The homopolymer or copolymer according to claim 25 wherein x is 4 and y is 2.

27. The homopolymer or copolymer according to claim 1 wherein said polymers contain sufficient dopant to provide a doped polyaniline having a conductivity of at least about $10^{-6}$ ohm$^{-1}$cm$^{-1}$.

28. The homopolymer or copolymer according to claim 1 wherein said conductivity is at least about $10^{-3}$ohm$^{-1}$cm$^{-1}$.

29. The homopolymer or copolymer according to claim 28 wherein said conductivity is at least about $10^{-2}$ohm$^{-1}$cm$^{-1}$.

30. The homopolymer or copolymer according to claim 29 wherein said conductivity is at least about $10^{-2}$ohm$^{-1}$cm$^{-1}$.

31. The homopolymer or copolymer according to claim 30 wherein said conductivity is at least about $10^{-1}$ohm$^{-1}$cm$^{-1}$.

32. The homopolymer or copolymer according to claim 31 wherein said conductivity is at least about $10^0$ohm$^{-1}$cm$^{-1}$.

33. The homopolymer or copolymer according to claim 1 wherein $R_2$ and $R_4$ are hydrogen or alkyl.

34. The homopolymer or copolymer according to claim 33 wherein $R_2$ and $R_4$ are hydrogen.

35. The homopolymer or copolymer according to claim 34 wherein m is 5 and n is 0.

36. The homopolymer or copolymer according to claim 1 wherein:
$R_2$ and $R_4$ are hydrogen;
n is 0; and
m is 4;
and wherein said dopant soluble is of the formula:

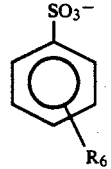

wherein:
$R_6$ is alkyl having from 1 to about 30 carbon atoms.

37. The homopolymer or copolymer according to claim 36 wherein:

$R_6$ is alkyl having from 1 to about 10 carbon atoms.

38. The homopolymer or copolymer according to claim 37 wherein $R_6$ is methyl substituted of the para position.

39. The homopolymer or copolymer according to claim 38 wherein $R_6$ is dodecyl substituted of the para position.

40. A thermally stable electrically conductive doped polyaniline comprising an ionized polyaniline backbone polymer and a dopant solute species selected from the group consisting of:

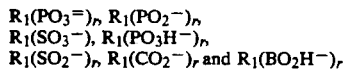

wherein $R_1$ is a substituted or unsubstituted organic radical; and r is a positive whole number equal to or greater than 1.

41. A polyaniline according to claim 40 wherein said homopolymer or copolymer comprises recurring units selected from the group consisting of moieties of the formula:

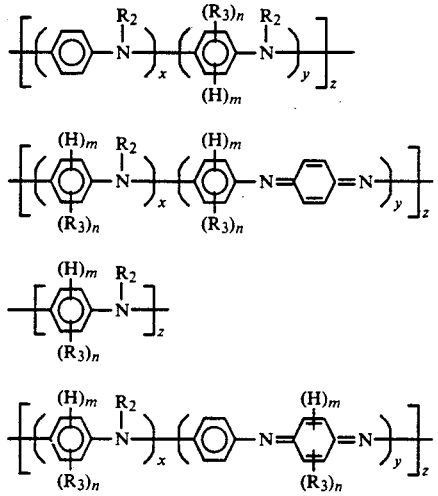

wherein:

x is an integer equal to or greater than 1;

y is equal to or greater than 1, with the proviso that the ratio of x to y is greater than about 0.5;

z, v and u are the same or different and are equal to or greater than about 1;

n is an integer from 0 to 4;

m is an integer from 1 to 5 with the proviso that the sum of n and m is 5;

$R_2$ and $R_4$ are the same or different at each occurrence and are $R_3$ substituents, hydrogen or alkyl with the proviso that at least one of $R_2$ or $R_4$ is hydrogen and with the further proviso that $R_2$ and $R_4$ are not alkylsulfoyl, arylsulfonyl or alkanoyl;

$R_3$ is the same or different at each occurrence and is alkyl, alkenyl, alkoxy, cycloalkyl, cycloalkenyl, alkanoyl, alkylthio, aryloxy, alkylthioalkyl, alkylaryl, arylalkyl, alkylsulfinyl, alkoxyalkyl, alkylsulfonyl, aryl, arylthio, arylsulfinyl, alkoxycarbonyl, phosphinic acid, phosphonic acid, alkylsilyl, boric acid, arylsufonyl, carboxylic acid, halo, hydroxy, phosphate, sulfonate, phosphonate, borate, phosphinate, carboxylate, cyano, sulfonic acid, phosphoric acid or alkyl or alkoxy substituted with one or more sulfonic acid, carboxylic acid, sulfinate, phosphoric acid, boric acid, sulfinic acid, halo, cyano, epoxy, hydroxy, sulfonate, phosphate, phosphonate, phosphinic acid, phosphinate, carboxylate, phosphonic acid or borate moieties; or any two $R_3$ substituents or any one $R_3$ group and any $R_2$ or $R_4$ group together may form an alkylene or alkenylene chain completing a 3, 4, 5, 6 or 7 membered aromatic or alicyclic carbon ring, or any two Z is equal to or greater than 1 alkenylene chain completing a 3, 4, 5, 6 or 7 membered aromatic or alicyclic carbon ring which includes one or more divalent nitrogen, ester, carbonyl, sulfur, sulfinyl, sulfonyl or oxygen.

42. A polyaniline according to claim 40 wherein m is about 3 to about 5.

43. A polyaniline according to claim 42 wherein m is from about 4 to about 5.

44. A polyaniline according to claim 40 wherein said polyaniline is derived from substituted anilines.

45. A polyaniline according to claim 40 wherein said polyaniline is derived from unsubstituted aniline.

46. A polyaniline according to claim 41 wherein $R_3$ is the same or different at each occurrence and is alkyl or alkoxy having from 1 to about 30 carbon atoms, cyano, halo, hydroxy, or alkyl or alkoxy substituted with carboxylic acid, phosphoric acid, phosphinic acid, phosphinate, boric acid, carboxylate, sulfinic acid, sulfonic acid, sulfonate, sulfinate, phosphonate, phosphate, phosphoric acid or borate substituents.

47. A polyaniline according to claim 46 wherein $R_3$ is the same or different at each occurrence and is alkyl or alkoxy having from 1 to about 20 carbon atoms, or substituted alkyl or alkoxy having from 1 to about 20 carbon atoms wherein permissible substituents are alkyl, carboxylic acid, sulfonic acid, phosphoric acid, boric acid, sulfinate, sulfonate, phosphonate, phosphate, carboxylate, phosphonic acid or borate substituents.

48. A polyaniline according to claim 47 wherein $R_3$ is the same or different at each occurrence and is alkyl having from 1 to about 4 carbon atoms.

49. A polyaniline according to claim 48 wherein n is 0, 1, 2, 3 or 4.

50. A polyaniline according to claim 49 wherein n is 0, 1, 2 or 3.

51. A polyaniline according to claim 50 wherein n is 0, or 1.

52. A polyaniline according to claim 41 wherein $R_3$ is alkoxy, alkyl, halo, phenyl, haloalkyl, perhaloalkyl, cyano, or alkoxy, alkyl or phenyl substituted with one or more nitro, alkoxy, sulfonic acid, carboxylic acid, boric acid, phosphoric acid, hydroxy, fluoro, cyano, sulfinic acid, carboxylate, sulfonate, sulfinate, phosphonate, phosphate, phosphoric acid or borate or an aliphatic moiety of the formula:

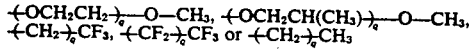

wherein q is a positive whole number.

53. A polyaniline according to claim 52 wherein:

$R_3$ is fluoro, or substituted or unsubstituted alkyl, alkoxy or phenyl wherein permissible substituents are one or more fluoro, sulfonic acid, phosphoric acid, sulfinic acid, phosphonate, phosphate, sulfonate, borate, phosphonic acid, boric acid, carboxylic acid, carboxylate, hydroxy or cyano.

54. A polyaniline according to claim 53 wherein:
R$_3$ is fluoro, alkyl or alkyl or alkoxy substituted with one or more carboxylic acid, sulfonic acid, phosphonate, carboxylate, phosphate, sulfonate, borate, sulfinic acid, sulfinate, phosphonic acid, phosphoric acid, boric acid, fluoro or substituents wherein the aliphatic moiety contains from about 1 to about 30 carbon atoms, or R$_3$ phenyl or phenyl substituted with one or more substituents selected from the group consisting of fluoro, alkyl or alkyl substituted with one or more fluoro, cyano, carboxylic, sulfonic, borate, carboxylate, sulfinic acid, sulfinate, sulfonate, phosphate, phosphoric acid or boric acid moieties.

55. A polyaniline of claim 40 wherein R$_1$ is alkyl or substituted alkyl.

56. A polyaniline according to claim 40 wherein said dopant is a compound of the formula:

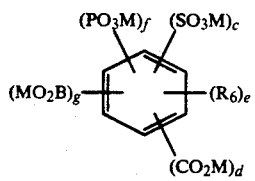

wherein:
M is H$^+$, a metal cation or non-metal cation;
c is 0, 1, 2, 3 or 4;
e is 0, 1 or 2;
f is 0, 1 or 2;
g is 0, 1 or 2;
d is 0, 1 or 2; and
R$_6$ is hydroxy, alkyl, halo, cyano, phosphonic acid, phosphonate, phosphinic acid, phosphinate, alkoxy, hydroxy, sulfinic acid, sulfinate, or substituted or unsubstituted aryl or alkyl having from 1 to about 30 carbon atoms wherein permissible substituents are perhaloalkyl, halo, cyano, phosphonate, borate, phosphonic acid, sulfonate, carboxylate, phosphate, haloalkyl, sulfonic acid, sulfinic acid, sulfinate, phosphoric acid, boric acid, carboxylic acid, or any two R$_6$ substituents together may form an alkenylene chain completing a fused aromatic ring system, which chain may be unsubstituted or substituted with one or more halo, hydroxy, phosphonate, borate, phosphonic acid, sulfonate, phosphate, boric acid, phosphoric acid, carboxylate, cyano, sulfonic acid or carboxylic acid groups, or R$_6$ is an aliphatic moiety of the formula:

—(OCH$_2$CH$_2$)$_q$OCH$_3$ or —(OCH$_2$CH(CH$_3$))$_q$OCH$_3$ wherein q is 1 to about 10.

57. A polyaniline according to claim 56 wherein said dopant is a compound of the formula:

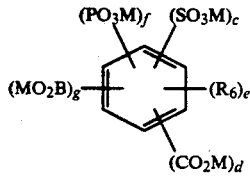

wherein:
M is H$^+$;
c is 1, 2 or 3;
d and e are the same or different and are 0, 1 or 2; and
R$_6$ is hydroxy, cyano, halo or substituted or unsubstituted alkyl having from 1 to about 30 carbon atoms, phenyl or phenylalkyl having from 7 to about 30 carbon atoms wherein permissible substituents are halo, alkyl, alkoxy, cyano, boric acid, phosphoric acid, phosphate, borate, phosphonate, sulfonate, phosphonic acid, sulfonic acid, carboxylate and carboxylic acid groups or any two R$_6$ groups may form a divalent substituted or unsubstituted alkenylene chain completing a naphthalene, anthracene or phenanthracene-fused ring structure, which chain may be substituted with one or more hydroxy, cyano, halo, sulfonic acid, boric acid, phosphoric acid, alkyl, alkoxy, sulfinate, phosphate, borate, phosphonate, carboxylate, phosphonic acid, phosphonate, sulfonate, boric acid, borate, sulfinic acid, phosphoric acid, phosphate, sulfonate, phosphonic acid, carboxylic acid or alkyl substituted with one or more carboxylic acid, sulfonic acid or fluoro groups.

58. A polyaniline according to claim 57 wherein:
M is H$^+$;
c is 1, 2 or 3;
d and e are the same or different and are 0, 1 or 2; and
R$_6$ is alkyl having from 1 to about 15 carbon atoms, fluoro, alkyl substituted with one or more fluoro, cyano, boric acid, phosphoric acid, phosphate, carboxylate, borate, phosphonate, sulfonate, sulfinic acid, sulfinate, phosphonic acid, sulfonate, sulfonic acid or carboxylic acid group; or any two R$_6$ groups together may form a substituted or unsubstituted divalent alkenylene chain completing a naphthalene, anthracene or phenanthrene structure where permissible substituents are one or more sulfonic acid, boric acid, phosphoric acid, phosphate, borate, sulfinic acid, sulfinate, phosphonate, carboxylate, sulfonate, phosphonic acid, fluoro, carboxylic acid, or alkyl substituted with one or more fluoro, sulfonic acid, carboxylate, phosphonic acid, phosphonate, sulfonate, or carboxylic acid groups.

59. A polyaniline according to claim 57 wherein:
M is H$^+$;
c is 1, 2 or 3;
d is 0;
e is 0, 1 or 2; and
R$_6$ is alkyl, fluoro or alkyl substituted with one or more fluoro substituents or any two R$_5$ groups together may form a substituted or unsubstituted divalent alkenylene chain completing a naphthalene, anthracene or phenanthracene ring structure, wherein permissible substituents are one or more sulfonic acid, fluoro or alkyl substituted with one or more sulfonic acid or fluoro groups.

60. A polyaniline according to claim 40 wherein said polyaniline contain sufficient dopant to provide a doped polyaniline having a conductivity of at least about $10^{-6}$ohm$^{-1}$cm$^{-1}$.

61. A polyaniline according to claim 60 wherein said conductivity is at least about $10^{-4}$ohm$^{-1}$cm$^{-1}$.

62. A polyaniline according to claim 61 wherein said conductivity is at least about $10^{-3}$ohm$^{-1}$cm$^{-1}$.

63. A polyaniline according to claim 62 wherein said conductivity is at least about $10^{-2}$ohm$^{-1}$cm$^{-1}$.

64. A polyaniline according to claim 63 wherein said conductivity is at least about $10^{-2}$ohm$^{-1}$cm$^{-1}$.

65. A polyaniline according to claim 64 wherein said conductivity is at least about $10^{-1}$ohm$^{-1}$cm$^{-1}$.

66. A polyaniline according to claim 65 wherein said conductivity is at least about $10^{0}$ohm$^{-1}$cm$^{-1}$.

67. A polyaniline according to claim 41 wherein $R_2$ and $R_4$ are hydrogen or alkyl.

68. A polyaniline according to claim 67 wherein $R_2$ and $R_4$ are hydrogen.

69. A polyaniline according to claim 68 wherein m is 5 and n is 0.

* * * * *

UNITED STATES PATENT AND TRADEMARK OFFICE
CERTIFICATE OF CORRECTION

PATENT NO. : 5,160,457

DATED : Nov. 3, 1992

INVENTOR(S) : Ronald L. Elsenbaumer

It is certified that error appears in the above-identified patent and that said Letters Patent is hereby corrected as shown below:

On the title page, Item:

"[75] Inventor: Ronald L. Elsenbaumer, Morristown, N.J."

should read:

---[75] Inventors: Ronald L. Elsenbaumer, Morristown; Chien-Chung Han, Madison; Kwan-Yue Alex Jen, Old Bridge, all of N.J.---

Signed and Sealed this

Eighteenth Day of January, 1994

BRUCE LEHMAN

*Attest:*

*Attesting Officer*  *Commissioner of Patents and Trademarks*